United States Patent
Moore et al.

(10) Patent No.: US 12,359,133 B2
(45) Date of Patent: Jul. 15, 2025

(54) PROCESS AND DEVICE FOR TREATING HIGH SULFUR HEAVY MARINE FUEL OIL FOR USE AS FEEDSTOCK IN A SUBSEQUENT REFINERY UNIT

(71) Applicant: Magema Technology LLC, Houston, TX (US)

(72) Inventors: Michael Joseph Moore, Houston, TX (US); Bertrand Ray Klussmann, Houston, TX (US); Carter James White, Houston, TX (US)

(73) Assignee: Magēmā Technology LLC, Houston, TX (US)

( * ) Notice: Subject to any disclaimer, the term of this patent is extended or adjusted under 35 U.S.C. 154(b) by 0 days.

(21) Appl. No.: 18/417,569

(22) Filed: Jan. 19, 2024

(65) Prior Publication Data

US 2024/0150662 A1    May 9, 2024

Related U.S. Application Data

(63) Continuation of application No. 18/074,212, filed on Dec. 2, 2022, now Pat. No. 11,912,945, which is a (Continued)

(51) Int. Cl.
*C10G 45/04* (2006.01)
*B01D 3/34* (2006.01)
(Continued)

(52) U.S. Cl.
CPC .............. *C10G 45/04* (2013.01); *B01D 3/343* (2013.01); *B01D 53/1481* (2013.01);
(Continued)

(58) Field of Classification Search
CPC .............. C10G 65/12; C10G 2300/202; C10G 2300/205; C10G 2300/206;
(Continued)

(56) References Cited

U.S. PATENT DOCUMENTS 5,837,130 A * 11/1998 Crossland .............. C10G 65/00
  208/204
9,057,035 B1 * 6/2015 Kraus ..................... C10L 1/04
(Continued)

FOREIGN PATENT DOCUMENTS

WO    WO-2018073018 A1 * 4/2018    .............. C10G 11/00

*Primary Examiner* — Randy Boyer
*Assistant Examiner* — Juan C Valencia
(74) *Attorney, Agent, or Firm* — Carter J. White

(57) ABSTRACT

A multi-stage process for transforming a high sulfur ISO 8217 compliant Feedstock Heavy Marine Fuel Oil involving a core desulfurizing process that produces a Product Heavy Marine Fuel Oil that can be used as a feedstock for subsequent refinery process such as anode grade coking, needle coking and fluid catalytic cracking. The Product Heavy Marine Fuel Oil exhibits multiple properties desirable as a feedstock for those processes including a sulfur level has a maximum sulfur content (ISO 14596 or ISO 8754) between the range of 0.05 mass % to 1.0 mass. A process plant for conducting the process is also disclosed.

12 Claims, 5 Drawing Sheets

Related U.S. Application Data continuation of application No. 16/681,093, filed on Nov. 12, 2019, now Pat. No. 11,530,360, which is a continuation of application No. 16/103,897, filed on Aug. 14, 2018, now Pat. No. 10,533,141, which is a continuation-in-part of application No. PCT/US2018/017863, filed on Feb. 12, 2018, said application No. 16/103,897 is a continuation-in-part of application No. PCT/US2018/017855, filed on Feb. 12, 2018.

(60) Provisional application No. 62/589,479, filed on Nov. 21, 2017, provisional application No. 62/458,002, filed on Feb. 12, 2017.

(51) Int. Cl.

| | |
|---|---|
| *B01D 53/14* | (2006.01) |
| *B01J 8/00* | (2006.01) |
| *B01J 8/02* | (2006.01) |
| *B01J 8/04* | (2006.01) |
| *B01J 21/04* | (2006.01) |
| *B01J 23/24* | (2006.01) |
| *B01J 23/40* | (2006.01) |
| *B01J 23/74* | (2006.01) |
| *C10G 7/00* | (2006.01) |
| *C10G 25/00* | (2006.01) |
| *C10G 25/02* | (2006.01) |
| *C10G 45/02* | (2006.01) |
| *C10G 45/06* | (2006.01) |
| *C10G 45/08* | (2006.01) |
| *C10G 45/22* | (2006.01) |
| *C10G 47/02* | (2006.01) |
| *C10G 65/04* | (2006.01) |
| *C10G 65/16* | (2006.01) |
| *C10G 67/02* | (2006.01) |
| *C10G 67/06* | (2006.01) |
| *C10G 69/02* | (2006.01) |
| *C10L 1/04* | (2006.01) |
| *C10L 1/12* | (2006.01) |
| *C10L 1/14* | (2006.01) |
| *C10L 1/16* | (2006.01) |

(52) U.S. Cl.
CPC .............. *B01J 8/008* (2013.01); *B01J 8/0278* (2013.01); *B01J 8/0292* (2013.01); *B01J 8/0457* (2013.01); *B01J 8/0492* (2013.01); *B01J 21/04* (2013.01); *B01J 23/24* (2013.01); *B01J 23/40* (2013.01); *B01J 23/74* (2013.01); *C10G 7/00* (2013.01); *C10G 25/003* (2013.01); *C10G 25/02* (2013.01); *C10G 45/02* (2013.01); *C10G 45/06* (2013.01); *C10G 45/08* (2013.01); *C10G 45/22* (2013.01); *C10G 47/02* (2013.01); *C10G 65/04* (2013.01); *C10G 65/16* (2013.01); *C10G 67/02* (2013.01); *C10G 67/06* (2013.01); *C10G 69/02* (2013.01); *C10L 1/04* (2013.01); *C10L 1/12* (2013.01); *C10L 1/14* (2013.01); *C10L 1/1608* (2013.01); *B01J 2208/00557* (2013.01); *B01J 2208/02* (2013.01); *B01J 2208/025* (2013.01); *C10G 2300/1037* (2013.01); *C10G 2300/1044* (2013.01); *C10G 2300/1048* (2013.01); *C10G 2300/1059* (2013.01); *C10G 2300/107* (2013.01); *C10G 2300/1077* (2013.01); *C10G 2300/201* (2013.01); *C10G 2300/202* (2013.01); *C10G 2300/205* (2013.01); *C10G 2300/206* (2013.01); *C10G 2300/207* (2013.01); *C10G 2300/208* (2013.01); *C10G 2300/30* (2013.01); *C10G 2300/302* (2013.01); *C10G 2300/308* (2013.01); *C10G 2300/4012* (2013.01); *C10G 2300/4018* (2013.01); *C10G 2300/4062* (2013.01); *C10G 2300/70* (2013.01); *C10G 2300/80* (2013.01); *C10G 2400/04* (2013.01); *C10G 2400/06* (2013.01); *C10L 2200/0263* (2013.01); *C10L 2200/0438* (2013.01); *C10L 2270/02* (2013.01); *C10L 2270/026* (2013.01)

(58) Field of Classification Search
CPC ........ C10G 2300/207; C10G 2300/208; C10G 2300/30; C10G 2300/302; C10G 2300/308; C10G 2300/4012; C10G 2300/4018; C10G 2300/4062; C10G 2300/70; C10G 2300/80; C10G 2400/04; C10G 2400/06; C10G 45/00; C10G 47/02; C10G 65/04; C10G 65/16; C10G 67/02; C10G 67/06; C10G 69/02; C10G 2300/1037; C10G 2300/1044; C10G 2300/1048; C10G 2300/1059; C10G 2300/107; C10G 2300/1077; C10G 2300/201; C10G 45/04; C10G 7/00; C10G 25/003; C10G 25/02; C10G 45/02; C10G 45/06; C10G 45/08; C10G 45/22; B01D 53/18; B01D 3/343; B01D 53/1481; C10L 1/183; C10L 2200/0263; C10L 2200/0438; C10L 2270/02; C10L 2270/026; C10L 1/04; C10L 1/12; C10L 1/14; C10L 1/1608; F23C 13/08; B01J 2208/00557; B01J 2208/02; B01J 2208/025; B01J 8/008; B01J 8/0278; B01J 8/0292; B01J 8/0457; B01J 8/0492; B01J 21/04; B01J 23/24; B01J 23/40; B01J 23/74

See application file for complete search history.

(56) References Cited

U.S. PATENT DOCUMENTS

| | | | |
|---|---|---|---|
| 2016/0160139 A1* | 6/2016 | Robinson ............... | C10G 45/08 208/15 |
| 2017/0044451 A1* | 2/2017 | Kar .......................... | C10L 1/14 |
| 2019/0078027 A1* | 3/2019 | Deimund ............... | C10G 47/18 |

\* cited by examiner

PROCESS AND DEVICE FOR TREATING HIGH SULFUR HEAVY MARINE FUEL OIL FOR USE AS FEEDSTOCK IN A SUBSEQUENT REFINERY UNIT

This application is a continuation of U.S. application Ser. No. 18/074,212, filed 2 Dec. 2022; U.S. application Ser. No. 18/074,212 is a continuation of U.S. application Ser. No. 16/681,093, filed 12 Nov. 2019, now U.S. Pat. No. 11,530,360, granted 20 Dec. 2022; U.S. application Ser. No. 16/681,093 is a continuation of U.S. application Ser. No. 16/103,897, filed 14 Aug. 2018, now U.S. patent Ser. No. 10/533,141, granted 14 Jan. 2020; U.S. application Ser. No. 16/103,897 is a continuation-in-part of Application No. PCT/US2018/017863, filed 12 Feb. 2018 now expired, Application No. PCT/US2018/017863 claims priority to U.S. Provisional Application No. 62/589,479, filed 21 Nov. 2017, now expired, and Application No. PCT/US2018/017863 also claims priority to U.S. Provisional Application No. 62/458,002, filed 12 Feb. 2017, now expired; U.S. application Ser. No. 16/103,897 is also a continuation-in-part of Application No. PCT/US2018/017855, filed 12 Feb. 2018 now expired, Application No. PCT/US2018/017855 claims priority to U.S. Provisional Application No. 62/589,479, filed 21 Nov. 2017, now expired, and Application No. PCT/US2018/017855 also claims priority to U.S. Provisional Application No. 62/458,002, filed 12 Feb. 2017, now expired, the entire contents of each of the recited foregoing applications being incorporated herein in their entirety.

BACKGROUND

There are two basic marine fuel types: distillate based marine fuel, also known as Marine Gas Oil (MGO) or Marine Diesel Oil (MDO); and residual based marine fuel, also known as heavy marine fuel oil (HMFO). Distillate based marine fuel both MGO and MDO, comprises petroleum middle distillate fractions separated from crude oil in a refinery via a distillation process. Gasoil (also known as medium diesel) is a petroleum middle distillate in boiling range and viscosity between kerosene (light distillate) and lubricating oil (heavy distillate) containing a mixture of $C_{10}$ to $C_{19}$ hydrocarbons. Gasoil (a heavy distillate) is used to heat homes and is used blending with lighter middle distillates as a fuel for heavy equipment such as cranes, bulldozers, generators, bobcats, tractors and combine harvesters. Generally maximizing middle distillate recovery from heavy distillates mixed with petroleum residues is the most economic use of these materials by refiners because they can crack gas oils into valuable gasoline and distillates in a fluid catalytic cracking (FCC) unit. Diesel oils for road use are very similar to gas oils with road use diesel containing predominantly contain a middle distillate mixture of $C_{10}$ through $C_{19}$ hydrocarbons, which include approximately 64% aliphatic hydrocarbons, 1-2% olefinic hydrocarbons, and 35% aromatic hydrocarbons. Distillate based marine fuels (MDO and MGO) are essentially road diesel or gas oil fractions blended with up to 15% residual process streams, and optionally up to 5% volume of polycyclic aromatic hydrocarbons (asphaltenes). The residual and asphaltene materials are blended into the middle distillate to form MDO and MGO as a way to both swell volume and productively use these low value materials.

Asphaltenes are large and complex polycyclic hydrocarbons with a propensity to form complex and waxy precipitates, especially in the presence of aliphatic (paraffinic) hydrocarbons that are the primary component of Marine Diesel. Once asphaltenes have precipitated out, they are notoriously difficult to re-dissolve and are described as fuel tank sludge in the marine shipping industry and marine bunker fueling industry. One of skill in the art will appreciate that mixing Marine Diesel with asphaltenes and process residues is limited by the compatibility of the materials and formation of asphaltene precipitates and the minimum Cetane number required for such fuels.

Residual based fuels or Heavy Marine Fuel Oil (HMFO) are used by large ocean-going ships as fuel for large two stroke diesel engines for over 50 years. HMFO is a blend of the residues generated throughout the crude oil refinery process. Typical refinery streams combined to from HMFO may include, but are not limited to: atmospheric tower bottoms (i.e. atmospheric residues), vacuum tower bottoms (i.e. vacuum residues) visbreaker residue, FCC Light Cycle Oil (LCO), FCC Heavy Cycle Oil (HCO) also known as FCC bottoms, FCC Slurry Oil, heavy gas oils and delayed cracker oil (DCO), deasphalted oils (DAO); heavy aromatic residues and mixtures of polycyclic aromatic hydrocarbons, reclaimed land transport motor oils; pyrolysis oils and tars; aspahltene solids and tars; and minor portions (often less than 20% vol.) of middle distillate materials such as cutter oil, kerosene or diesel to achieve a desired viscosity. HMFO has a higher aromatic content (especially polynuclear aromatics and asphaltenes) than the marine distillate fuels noted above. The HMFO component mixture varies widely depending upon the crude slate (i.e. source of crude oil) processed by a refinery and the processes utilized within that refinery to extract the most value out of a barrel of crude oil. The HMFO is generally characterized as being highly viscous, high in sulfur and metal content (up to 5 wt %), and high in asphaltenes making HMFO the one product of the refining process that has historically had a per barrel value less than feedstock crude oil.

Industry statistics indicate that about 90% of the HMFO sold contains 3.5 weight % sulfur. With an estimated total worldwide consumption of HMFO of approximately 300 million tons per year, the annual production of sulfur dioxide by the shipping industry is estimated to be over 21 million tons per year. Emissions from HMFO burning in ships contribute significantly to both global marine air pollution and local marine air pollution levels.

The International Convention for the Prevention of Pollution from Ships, also known as the MARPOL convention or just MARPOL, as administered by the International Maritime Organization (IMO) was enacted to prevent marine pollution (i.e. marpol) from ships. In 1997, a new annex was added to the MARPOL convention; the Regulations for the Prevention of Air Pollution from Ships—Annex VI to minimize airborne emissions from ships ($SO_x$, $NO_x$, ODS, VOC) and their contribution to global air pollution. A revised Annex VI with tightened emissions limits was adopted in October 2008 and effective 1 Jul. 2010 (hereafter called Annex VI (revised) or simply Annex VI).

MARPOL Annex VI (revised) adopted in 2008 established a set of stringent air emissions limits for all vessel and more specifically designated Emission Control Areas (ECAs). The ECAs under MARPOL Annex VI are: i) Baltic Sea area—as defined in Annex I of MARPOL—$SO_x$ only; ii) North Sea area—as defined in Annex V of MARPOL—$SO_x$ only; iii) North American—as defined in Appendix VII of Annex VI of MARPOL—$SO_x$, $NO_x$, and PM; and, iv) United States Caribbean Sea area—as defined in Appendix VII of Annex VI of MARPOL—$SO_x$, $NO_x$ and PM.

Annex VI (revised) was codified in the United States by the Act to Prevent Pollution from Ships (APPS). Under the authority of APPS, the U.S. Environmental Protection Agency (the EPA), in consultation with the United States Coast Guard (USCG), promulgated regulations which incorporate by reference the full text of Annex VI. See 40 C.F.R. § 1043.100(a)(1). On Aug. 1, 2012 the maximum sulfur content of all marine fuel oils used onboard ships operating in US waters/ECA was reduced from 3.5% wt. to 1.00% wt. (10,000 ppm) and on Jan. 1, 2015 the maximum sulfur content of all marine fuel oils used in the North American ECA was lowered to 0.10% wt. (1,000 ppm). At the time of implementation, the United States government indicated that vessel operators must vigorously prepare to comply with the 0.10% wt. (1,000 ppm) US ECA marine fuel oil sulfur standard. To encourage compliance, the EPA and USCG refused to consider the cost of compliant low sulfur fuel oil to be a valid basis for claiming that compliant fuel oil was not available for purchase. For over five years there has been a very strong economic incentive to meet the marine industry demands for low sulfur HMFO, however technically viable solutions have not been realized and a premium price has been commanded by refiners to supply a low sulfur HMFO compliant with Annex VI sulfur emissions requirements in the ECA areas.

Since enactment in 2010, the global sulfur cap for HMFO outside of the ECA areas was set by Annex VI at 3.50% wt. effective 1 Jan. 2012; with a further reduction to 0.50% wt, effective 1 Jan. 2020. The global cap on sulfur content in HMFO has been the subject of much discussion in both the marine shipping and marine fuel bunkering industry. There has been and continues to be a very strong economic incentive to meet the international marine industry demands for low sulfur HMFO (i.e. HMFO with a sulfur content less than 0.50 wt. %. Notwithstanding this global demand, solutions for transforming high sulfur HMFO into low sulfur HMFO have not been realized or brought to market. There is an on-going and urgent demand for processes and methods for making a low sulfur HMFO compliant with MARPOL Annex VI emissions requirements.

Replacement of heavy marine fuel oil with marine gas oil or marine diesel: One primary solution to the demand for low sulfur HMFO to simply replace high sulfur HMFO with marine gas oil (MGO) or marine diesel (MDO). The first major difficulty is the constraint in global supply of middle distillate materials that make up 85-90% vol of MGO and MDO. It is reported that the effective spare capacity to produce MGO is less than 100 million metric tons per year resulting in an annual shortfall in marine fuel of over 200 million metric tons per year. Refiners not only lack the capacity to increase the production of MGO, but they have no economic motivation because higher value and higher margins can be obtained from using middle distillate fractions for low sulfur diesel fuel for land-based transportation systems (i.e. trucks, trains, mass transit systems, heavy construction equipment, etc.).

Processing of residual oils. For the past several decades, the focus of refining industry research efforts related to the processing of heavy oils (crude oils, distressed oils, or residual oils) has been on upgrading the properties of these low value refinery process oils to create middle distillate and lighter oils with greater value. The challenge has been that crude oil, distressed oil and residues contain high levels of sulfur, nitrogen, phosphorous, metals (especially vanadium and nickel); asphaltenes and thus exhibit a propensity to form carbon or coke on the catalyst. The sulfur and nitrogen molecules are highly refractory and aromatically stable and thus difficult and expensive to crack or remove. Vanadium and nickel porphyrins and other metal organic compounds are responsible for catalyst contamination and corrosion problems in the refinery. The sulfur, nitrogen, and phosphorous, must be removed because they are well-known poisons for the precious metal (platinum and palladium) catalysts utilized in the processes downstream of the atmospheric or vacuum distillation towers.

The difficulties treating atmospheric or vacuum residual streams has been known for many years and has been the subject of considerable research and investigation. Numerous residue-oil conversion processes have been developed in which the goals are same: 1) create a more valuable, preferably middle distillate range hydrocarbons; and 2) concentrate the contaminates such as sulfur, nitrogen, phosphorous, metals and asphaltenes into a form (coke, heavy coker residue, FCC slurry oil) for removal from the refinery stream. Well known and accepted practice in the refining industry is to increase the reaction severity (elevated temperature and pressure) to produce hydrocarbon products that are lighter and more purified, increase catalyst life times and remove sulfur, nitrogen, phosphorous, metals and asphaltenes from the refinery stream.

In summary, since the announcement of the MARPOL Annex VI standards reducing the global levels of sulfur in HMFO, refiners of crude oil have had modest success in their technical efforts to re-purpose high sulfur HMFO. With demand for high sulfur HMFO decreasing and the use of low sulfur alternatives in the marine industry, there exists a long standing and unmet need for processes and devices that transform high sulfur HMFO for use as a feedstock to other subsequent refinery processes.

SUMMARY

It is a general objective to transform high sulfur a Heavy Marine Fuel Oil (HMFO) in a multi stage process that minimizes the changes in the desirable feed properties of the HMFO and minimizes the production of by-product hydrocarbons (i.e. light hydrocarbons having $C_1$-$C_4$ and wild naphtha ($C_5$-$C_{20}$)).

A first aspect and illustrative embodiment encompasses a multi-stage process for treating high sulfur Heavy Marine Fuel Oil for use as feedstock in a subsequent refinery unit, the process involving: mixing a quantity of the Feedstock Heavy Marine Fuel Oil with a quantity of Activating Gas mixture to give a Feedstock Mixture; contacting the Feedstock Mixture with one or more catalysts under reactive conditions to form a Process Mixture from the Feedstock Mixture; receiving the Process Mixture and separating the Product Heavy Marine Fuel Oil liquid components of the Process Mixture from the gaseous components and by-product hydrocarbon components of the Process Mixture and, discharging the Product Heavy Marine Fuel Oil.

A second aspect and illustrative embodiment encompasses a device or plant for treating high sulfur Heavy Marine Fuel Oil and producing a Product HMFO for use as feedstock in a subsequent refinery unit. The illustrative devices embody the above illustrative core processes on a commercial scale.

A third aspect and illustrative embodiment encompasses a feedstock Heavy Marine Fuel Oil composition resulting from the above illustrative processes and devices.

DETAILED DESCRIPTION

Figure 1:
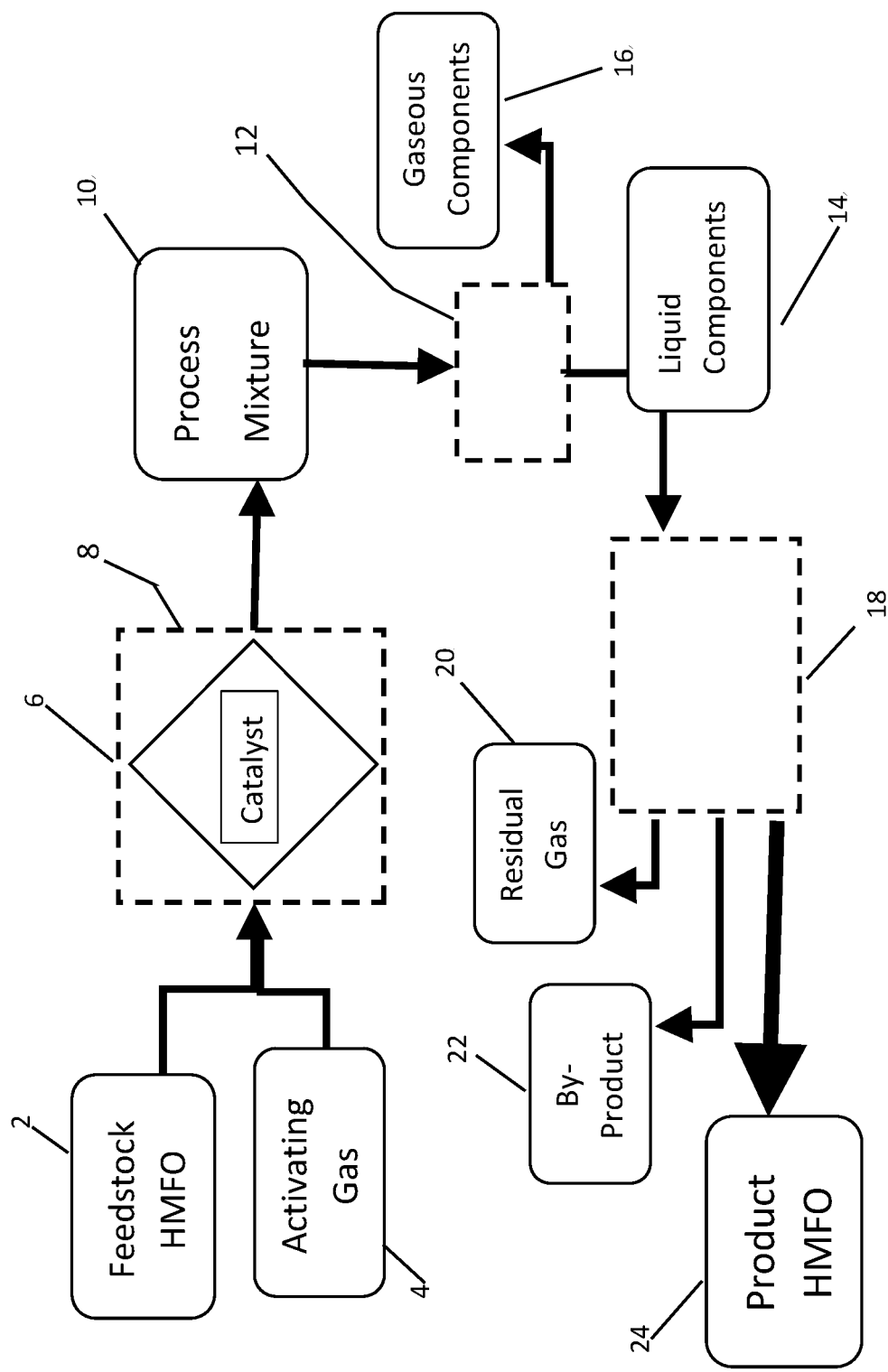
FIG. 1 is a process block flow diagram of an illustrative core process to produce Product HMFO.

The inventive concepts as described herein utilize terms that should be well known to one of skill in the art, however certain terms are utilized having a specific intended meaning and these terms are defined below:

Heavy Marine Fuel Oil (HMFO) is a petroleum product fuel compliant with the ISO 8217 (2017) standards for residual marine fuels except for the concentration levels of the Environmental Contaminates.

Environmental Contaminates are organic and inorganic components of HMFO that result in the formation of $SO_x$, $NO_x$ and particulate materials upon combustion.

Feedstock HMFO is a petroleum product fuel compliant with the ISO 8217 (2017) standards for the physical properties or characteristics of a merchantable HMFO except for the concentration of Environmental Contaminates, more specifically the Feedstock HMFO has a sulfur content greater than the global MARPOL Annex VI standard of 0.5% wt. sulfur, and preferably and has a sulfur content (ISO 14596 or ISO 8754) between the range of 5.0% wt. to 1.0% wt.

Product HMFO is a petroleum product fuel that has a maximum sulfur content (ISO 14596 or ISO 8754) between the range of 0.05% wt. to 1.0% wt. and is suitable for use as a feedstock in subsequent refinery process such Coking or Fluid Catalytic Cracking.

Activating Gas: is a mixture of gases utilized in the process combined with the catalyst to remove the environmental contaminates from the Feedstock HMFO.

Fluid communication: is the capability to transfer fluids (either liquid, gas or combinations thereof, which might have suspended solids) from a first vessel or location to a second vessel or location, this may encompass connections made by pipes (also called a line), spools, valves, intermediate holding tanks or surge tanks (also called a drum).

Merchantable quality: is a level of quality for a residual marine fuel oil so the fuel is fit for the ordinary purpose it should serve (i.e. serve as a residual fuel source for a marine ship) and can be commercially sold as and is fungible and compatible with other heavy or residual marine bunker fuels.

Bbl or bbl: is a standard volumetric measure for oil; 1 bbl=0.1589873 $m^3$; or 1bbl=158.9873 liters; or 1 bbl=42.00 US liquid gallons.

Bpd or bpd: is an abbreviation for Bbl per day.

SCF: is an abbreviation for standard cubic foot of a gas; a standard cubic foot (at 14.73 psi and 60° F.) equals 0.0283058557 standard cubic meters (at 101.325 kPa and 15° C.). Bulk Properties: are broadly defined as the physical properties or characteristics of a merchantable HMFO as required by ISO 8217 (2017); and more specifically the measurements include: kinematic viscosity at 50° C. as determined by ISO 3104; density at 15° C. as determined by ISO 3675; CCAI value as determined by ISO 8217, ANNEX B; flash point as determined by ISO 2719; total sediment—aged as determined by ISO 10307-2; carbon residue—micro method as determined by ISO 10370; and preferably aluminum plus silicon content as determined by ISO 10478.

The inventive concepts are illustrated in more detail in this description referring to the drawings, in which FIG. 1 shows the generalized block process flows for a core process of transforming a high sulfur Feedstock HMFO and producing a Product HMFO that may be utilized in subsequent refinery process. A predetermined volume of Feedstock HMFO (2) is mixed with a predetermined quantity of Activating Gas (4) to give a Feedstock Mixture. The Feedstock HMFO utilized generally complies with the bulk physical and certain key chemical properties for a residual marine fuel oil otherwise compliant with ISO 8217 (2017) exclusive of the Environmental Contaminates. More particularly, when the Environmental Contaminate is sulfur, the concentration of sulfur in the Feedstock HMFO may be between the range of 5.0% wt. to 1.0% wt. The Feedstock HMFO should have bulk physical properties required of an ISO 8217 (2017) compliant HMFO. The Feedstock HMFO should exhibit the Bulk Properties of: a maximum of kinematic viscosity at 50° C. (ISO 3104) between the range from 180 $mm^2$/s to 700 $mm^2$/s; a maximum of density at 15° C. (ISO 3675) between the range of 991.0 kg/m3 to 1010.0 $kg/m^3$; a CCAI in the range of 780 to 870; and a flash point (ISO 2719) no lower than 60° C. Environmental Contaminates other than sulfur that may be present in the Feedstock HMFO over the ISO requirements may include vanadium, nickel, iron, aluminum and silicon substantially reduced by the process of the present invention. However, one of skill in the art will appreciate that the vanadium content serves as a general indicator of these other Environmental Contaminates. In one preferred embodiment the vanadium content is ISO compliant so the Feedstock HMFO has a maximum vanadium content (ISO 14597) between the range from 350 mg/kg to 450 ppm mg/kg.

As for the properties of the Activating Gas, the Activating Gas should be selected from mixtures of nitrogen, hydrogen, carbon dioxide, gaseous water, and methane. The mixture of gases within the Activating Gas should have an ideal gas partial pressure of hydrogen ($p_{H2}$) greater than 80% of the total pressure of the Activating Gas mixture (P) and more preferably wherein the Activating Gas has an ideal gas partial pressure of hydrogen ($p_{H2}$) greater than 95% of the total pressure of the Activating Gas mixture (P). It will be appreciated by one of skill in the art that the molar content of the Activating Gas is another criterion the Activating Gas should have a hydrogen mole fraction in the range between 80% and 100% of the total moles of Activating Gas mixture.

The Feedstock Mixture (i.e. mixture of Feedstock HMFO and Activating Gas) is brought up to the process conditions of temperature and pressure and introduced into a Reactor System, preferably a reactor vessel, so the Feedstock Mixture is then contacted under reactive conditions with one or more catalysts (8) to form a Process Mixture from the Feedstock Mixture.

The core process conditions are selected so the ratio of the quantity of the Activating Gas to the quantity of Feedstock HMFO is 250 scf gas/bbl of Feedstock HMFO to 10,000 scf gas/bbl of Feedstock HMFO; and preferably between 2000 scf gas/bbl of Feedstock HMFO 1 to 5000 scf gas/bbl of Feedstock HMFO more preferably between 2500 scf gas/bbl of Feedstock HMFO to 4500 scf gas/bbl of Feedstock HMFO. The process conditions are selected so the total pressure in the first vessel is between of 250 psig and 3000 psig; preferably between 1000 psig and 2500 psig, and more preferably between 1500 psig and 2200 psig. The process reactive conditions are selected so the indicated temperature within the first vessel is between of 500° F. to 900° F., preferably between 650° F. and 850° F. and more preferably between 680° F. and 800° F. The process conditions are selected so the liquid hourly space velocity within the first vessel is between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst; and more preferably between 0.1 oil/hour/m$^3$ catalyst and 0.3 oil/hour/m$^3$ catalyst to achieve deep desulfurization with product sulfur levels below 0.1 ppmw.

One of skill in the art will appreciate that the core process reactive conditions are determined considering the hydraulic capacity of the unit. Exemplary hydraulic capacity for the treatment unit may be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day.

One of skill in the art will appreciate that a fixed bed reactor using a supported transition metal heterogeneous catalyst will be the technically easiest to implement and is preferred. However, alternative reactor types may be utilized including, but not limited to: ebullated or fluidized bed reactors; structured bed reactors; three-phase bubble reactors; reactive distillation bed reactors and the like all of which may be co-current or counter current. It is also contemplated that high flux or liquid full type reactors may be used such as those disclosed in U.S. Pat. Nos. 6,123,835; 6,428,686; 6,881,326; 7,291,257; 7,569,136 and other similar and related patents and patent applications.

The transition metal heterogeneous catalyst utilized comprises a porous inorganic oxide catalyst carrier and a transition metal catalytic metal. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The transition metal catalytic metal component of the catalyst is one or more metals selected from the group consisting of group 6, 8, 9 and 10 of the Periodic Table. In a preferred and illustrative embodiment, the transition metal heterogeneous catalyst is a porous inorganic oxide catalyst carrier and a transition metal catalyst, in which the preferred porous inorganic oxide catalyst carrier is alumina and the preferred transition metal catalyst is Ni—Mo, Co—Mo, Ni—W or Ni—Co—Mo. The process by which the transition metal heterogeneous catalyst is manufactured is known in the literature and preferably the catalysts are commercially available as hydrodemetallization catalysts, transition catalysts, desulfurization catalyst and combinations of these which might be pre-sulfided.

The Process Mixture (10) in this core process is removed from the Reactor System (8) and from being in contact with the one or more catalyst and is sent via fluid communication to a second vessel (12), preferably a gas-liquid separator or hot separators and cold separators, for separating the liquid components (14) of the Process Mixture from the bulk gaseous components (16) of the Process Mixture. The gaseous components (16) are treated beyond the battery limits of the immediate process. Such gaseous components may include a mixture of Activating Gas components and lighter hydrocarbons (mostly methane, ethane and propane but some wild naphtha) that may have been formed as part of the by-product hydrocarbons from the process.

The Liquid Components (16) in this core process are sent via fluid communication to a third vessel (18), preferably a fuel oil product stripper system, for separating any residual gaseous components (20) and by-product hydrocarbon components (22) from the Product HMFO (24). The residual gaseous components (20) may be a mixture of gases selected from the group consisting of: nitrogen, hydrogen, carbon dioxide, hydrogen sulfide, gaseous water, $C_1$-$C_3$ hydrocarbons. This residual gas is treated outside of the battery limits of the immediate process, combined with other gaseous components (16) removed from the Process Mixture (10) in the second vessel (12). The liquid by-product hydrocarbon component, which are condensable hydrocarbons formed in the process (22) may be a mixture selected from the group consisting of $C_4$-$C_{20}$ hydrocarbons (wild naphtha) (naphtha-diesel) and other condensable light liquid ($C_4$-$C_8$) hydrocarbons that can be utilized as part of the motor fuel blending pool or sold as gasoline and diesel blending components on the open market. It is also contemplated that a second draw (not shown) may be included to withdraw a distillate product, preferably a middle to heavy distillate. These liquid by-product hydrocarbons should be less than 15% wt., preferably less than 5% wt. and more preferably less than 3% wt. of the overall process mass balance.

The Product HMFO (24) resulting from the core process is discharged via fluid communication into storage tanks or for use beyond the battery limits of the immediate core process. The Product HMFO complies with ISO 8217 (2017) and has a maximum sulfur content (ISO 14596 or ISO 8754) between the range of 0.05 mass % to 1.0 mass % preferably a sulfur content (ISO 14596 or ISO 8754) between the range of 0.05 mass % ppm and 0.7 mass % and more preferably a sulfur content (ISO 14596 or ISO 8754) between the range of 0.1 mass % and 0.5 mass %. The vanadium content of the Product HMFO is also ISO compliant with a maximum vanadium content (ISO 14597) between the range from 350 mg/kg to 450 ppm mg/kg, preferably a vanadium content (ISO 14597) between the range of 200 mg/kg and 300 mg/kg and more preferably a vanadium content (ISO 14597) less than 50 mg/kg.

The Product HFMO should have bulk physical properties that are ISO 8217 (2017) compliant. The Product HMFO should exhibit Bulk Properties of: a maximum of kinematic viscosity at 50° C. (ISO 3104) between the range from 180 mm$^2$/s to 700 mm$^2$/s; a maximum of density at 15° C. (ISO 3675) between the range of 991.0 kg/m3 to 1010.0 kg/m$^3$; a CCAI value in the range of 780 to 870; a flash point (ISO 2719) no lower than 60.0° C.; a total sediment—aged (ISO 10307-2) of less than 0.10 mass %; a carbon residue—micro method (ISO 10370) lower than 20.00 mass %, and preferably an aluminum plus silicon (ISO 10478) content of less than 60 mg/kg.

Relative to the Feedstock HMFO, the Product HMFO will have a sulfur content (ISO 14596 or ISO 8754) between 1% and 20% of the maximum sulfur content of the Feedstock HMFO. That is the sulfur content of the Product will be reduced by about 80% or greater when compared to the Feedstock HMFO. Similarly, the vanadium content (ISO 14597) of the Product HMFO is between 1% and 20% of the maximum vanadium content of the Feedstock HMFO. One of skill in the art will appreciate that the above data indicates a substantial reduction in sulfur and vanadium content indicate a process having achieved a substantial reduction in the Environmental Contaminates from the Feedstock HMFO while maintaining the desirable properties of an ISO 8217 (2017) compliant and merchantable HMFO.

As a side note, the residual gaseous component is a mixture of gases selected from the group consisting of: nitrogen, hydrogen, carbon dioxide, hydrogen sulfide, gaseous water, $C_1$-$C_4$ hydrocarbons. An amine scrubber will effectively remove the hydrogen sulfide content which can then be processed using technologies and processes well known to one of skill in the art. In one preferable illustrative embodiment, the hydrogen sulfide is converted into elemental sulfur using the well-known Claus process. An alternative embodiment utilizes a proprietary process for conversion of the Hydrogen sulfide to hydrosulfuric acid. Either way, the sulfur is removed from entering the environment prior to combusting the HMFO in a ships engine. The cleaned gas can be vented, flared or more preferably recycled back for use as Activating Gas.

Pre and Post Process Units: It will be appreciated by one of skill in the art, that the conditions utilized in the core process have been intentionally selected to minimize cracking of hydrocarbons, but remove significant levels of sulfur and other Environmental Contaminates from the Feedstock HMFO. However, one of skill in the art will also appreciate there may be certain compounds present in the Feedstock HMFO removal of which would have a positive impact upon the subsequent process feedstock qualities of the Product HMFO. These processes and systems must achieve this without substantially altering the subsequent process feedstock qualities of the Product HMFO. Process for the Pre and Post treatment of the HMFO in the above illustrative core process have been described in greater detail in co-owned patent applications. These pre- and post-process units may include, but are not limited to: removal of Detrimental Solids (such as catalyst fines); treatment with microwave energy; treatment with ultrasound energy; extraction of sulfur and other polar compounds with ionic liquids; absorption of sulfur and organosulfur compounds on absorptive media; selective oxidation of the organosulfur compounds, including the use of peroxides and ozone to form sulfones which can be subsequently removed; dewatering and desalting units; the use of guard beds to remove detrimental materials such as clays, ionic solids, particles, and the like; and combinations of these.

Product HMFO and Use as Feedstock The Product HFMO resulting from the disclosed illustrative process may be used as a feedstock in subsequent refinery process selected from the group including: anode grade coking process unit, needle grade coking process unit and fluid catalytic cracking process unit. The Product HMFO has a sulfur content (ISO 14596 or ISO 8754) less than 0.5 wt % and preferably less than 0.1% wt. and thus forms a low sulfur feedstock material that is useful in subsequent refinery processes. That is the sulfur content of the Product HMFO has been reduced by about 80% or greater when compared to the Feedstock HMFO. One of skill in the art will appreciate the Product Heavy Marine Fuel Oil may be fractionated to remove a light to middle distillate fraction, said light to middle distillate fraction have a maximum boiling point less than 650° F., preferably less than 600° F. In this way one can remove a valuable by-product light and middle distillate fraction prior to sending it to the subsequent refinery processes. To illustrate and further explain the above inventive concepts examples of using the Product HMFO as a coker process unit feedstock and a fluid catalytic cracking process feedstock are described below.

Product HMFO as Coker Feedstock: Coking is a severe thermal cracking process during which residual feedstocks are cracked to produce lighter, more valuable products and simultaneously produce a coke material of desired quality. A fired heater is used in the process to reach thermal cracking temperatures of 485° C. to 505° C. For a delayed coker, the coking is delayed until the feed reaches the coking drums. The preheated feed in the tubes undergoes decomposition and condensation reactions and once the feed reaches the drum, the condensation reactions between the liquids result in the formation of coke along with the evolution of light gases and liquids.

The quality of the coke formed depends on the quality of the feed and the temperature, pressure and the recycle ratio of the process. Typically there are three kinds of cokes that can be obtained in the process: anode grade (sponge) coke, shot coke and needle coke. Anode grade coke is a porous solid which is used as a solid fuel or for the production of anodes for use in the aluminum industry. Shot coke is a less desirable coke occasionally produced along with sponge coke; it consists of small hard spheres of low porosity and typically is used as fuel. Needle coke is premium quality coke, which is characterized by a needle-like appearance and crystalline microstructure. The graphite artifacts made from needle coke have a low coefficient of thermal expansion and low electrical resistance and is used for making electrodes for use in the steel industry. The characteristics of the various cokes and their end use are presented below:

| Type of Coke | Characteristics | End Use |
|---|---|---|
| Anode Grade Coke | Sponge like appearance, higher surface area, lower contaminant levels, higher volatile content, higher HGI (Hardgrove grindabillity index) | Aluminum anodes, $TiO_2$ pigments |
| Shot Coke | Spherical appearance, lower surface area, lower volatiles, lower HGI, tends to agglomerate | Coke ovens, combustion |
| Needle Coke | Needlelike appearance, low volatiles, high carbon contents. | Electrodes, Synthetic Graphite |

One of skill in the art of coking will understand that key feedstock properties that affect Coke Yield and Quality are: Gravity; Distillation; Conradson Carbon Residue; Asphaltene Content; Sulfur; Metals/Ash; Nitrogen; Hydrogen Content/Aromaticity. Typical Feedstock Limitations to produce Anode Grade Coke generally include, but are not limited to: Sulfur: less than about 1.0 wt %; Vanadium: less than about 100 ppmw and Nickel: less than about 100 ppmw. Typical Feedstock Limitations to produce Needle Coke generally include, but are not limited to: Sulfur: in the range from about 0.0-0.7 wt %; Vanadium: less than about 50 ppmw; Nickel: less than about 50 ppmw; Aromatic Content: in the range from about 50-80 wt %; Asphaltene Content: less than about 8 wt %; Nitrogen Content: in the range from about 0.0-0.7 wt; Ash: less than about 100 ppmw. It will be quickly realized by one of skill in the art that the Product HMFO has meets all of the requirements necessary to be used as high quality coker feedstock, that is: low sulfur content (<1%), low vanadium content (typically <20 ppmw), low nickel content (typically <20 ppmw), high aromatics content (50-80%), low asphaltene content (<10%), low saturates content (<15%), micro carbon residue (MCR) content of 5-20% wt.

In a variation of the processes and devices disclosed above, specifically when a coker feedstock is the desired goal, certain modifications can be made to enhance or optimize the Product HMFO as a high quality coker feedstock material. For example, the design of the Product Stabilizer may be modified to take a distillate side cut product, to separate mid-boiling (<approximately 600 F) components from the Product HMFO Coker Feedstock. Alternatively, the separation of distillate product and Coker Feedstock can be achieved in a separate distillation column. One of skill in the art will appreciate that the cutpoint between Coker Feedstock and distillate may be adjusted to optimize coker performance. These modifications are well within the scope and skill of one in the art of refinery engineering and refinery process design.

Product HMFO as Fluid Catalytic Cracking Process Unit Feedstock: As the term is used in this disclosure, Fluid Catalytic Cracking (FCC) is utilized as a generalized term to encompass both Fluid Catalytic Cracking and Resid Fluid Catalytic Cracking processes.

The FCC Unit is the most common refinery unit used to upgrade heavier fractions to light products. The FCC cracks the feed material using heat in the presence of a catalyst. The primary product is FCC naphtha, which is used in gasoline product blending. The FCC also produces lighter products and heavier products that can be blended into diesel and residual fuel oil.

The FCC is particularly valuable in a refinery that is trying to maximize gasoline production over residual fuel oil. The FCC yields a high volume of high quality naphtha (high octane and low vapor pressure). However, the diesel yield is low and of low quality, since it is made up of cracked material which tends to have low cetane.

The RFCC is a variant on the FCC. It is a similar unit yielding a similar range and quality of products, but it is designed to handle heavier residual streams as a feed.

In the FCC Unit, heated feed is mixed with a heated catalyst and injected into a reactor, where the catalyst freely mixes with the feed as a fluid. As the feed is cracked, coke deposits on the catalyst, causing it to gradually deactivate. Cracked product is drawn off at the top of the reactor and is sent to a fractionator. Deactivated catalyst is drawn off the bottom of the reactor and is sent to a regenerator, where the coke is burned off by injecting heat and air. The cleaned (regenerated) catalyst is then sent back to the reactor, and the cycle repeats.

The catalyst moves around the reactor and regenerator circuits in seconds at very high velocities, so many internal surfaces on the catalyst circuit must be protected against erosion by having ceramic coatings. The heat generated in the regenerator from burning the coke off the catalyst provides the majority of the heat required for the separation reactions taking place in the reactor, and the unit has to be heat-balanced between the reactor and regenerator. Coke burned off the catalyst in the regenerator creates a mix of carbon monoxide and carbon dioxide plus some $SO_x$. This gas stream is passed through a carbon monoxide boiler and recovery gas compressor to recover some energy, then cleaned of catalyst fines and evacuated to the atmosphere, so the FCC is a major emitter of carbon dioxide from refineries.

The FCC produces a range of mostly lighter products, with the most significant being FCC gasoline. Typical products are: FCC naphtha—This material has octane and vapor pressure close to the quality specifications for finished gasoline. This is typically the largest product at around 50% of FCC output; Cycle oils—The FCC produces a diesel range product called cycle oil. This is highly aromatic, which makes it a poor diesel blendstock. It is typically blended into lower quality diesel, used as a cutter stock in fuel oil blending, or sent to the hydrocracker for upgrading; FCC slurry—The heaviest product from the FCC is a highly aromatic residual stream. This is sent for fuel oil blending, used as feed for the coker, or used to make specialty products such as carbon black or needle coke; FCC gas— The light ends from the FCC include both saturated and unsaturated hydrocarbons, such as $C_3$ and $C_4$ hydrocarbons. Lighter gases (ethane and methane) are sent to a fuel system and utilized to power the refinery operations.

Upon review of the properties and characteristics of the Product HMFO, one of skill in the art will appreciate that the disclosed process and devices improve the properties of a low value material in the form of high sulfur Heavy Marine Fuel Oil (which preferably is ISO 8217 (2017) compliant) in a way which allow it to be used as FCC Unit feedstock. More specifically, the Product HMFO exhibits desirable properties of an FCC Unit feedstock that include: Sulfur Content below 0.5 wt % and more preferably in the range of 0.1 to 0.05 wt % sulfur; Metals Content, preferably Vanadium: less than about 50 ppmw; and Nickel: less than about 50 ppmw; reduced Asphaltene Content, preferably to less than 10 wt %; reduced micro carbon residue (MCR) content of 5-20% wt and reduced Nitrogen Content: in the range from about 0.0-0.7 wt.

Because of the present invention, refiners will realize multiple economic and logistical benefits, including: no need to alter or rebalance the refinery operations and product streams in an effort to meet a new market demand for low sulfur or ultralow sulfur HMFO; instead to the otherwise previously low value high sulfur HMFO is transformed into a feedstock suitable for use in subsequent refinery process, more specifically in anode grade cokers and as feedstock into a fluid catalytic cracker. No additional units are needed in the refinery with additional hydrogen or sulfur capacity because the illustrative process can be conducted as a stand-alone unit; refinery operations can remain focused on those products that create the greatest value from the crude oil received (i.e. production of petrochemicals, gasoline and distillate (diesel); refiners can continue using the existing slates of crude oils without having to switch to sweeter or lighter crudes to meet the environmental requirements for HMFO products.

Figure 2:
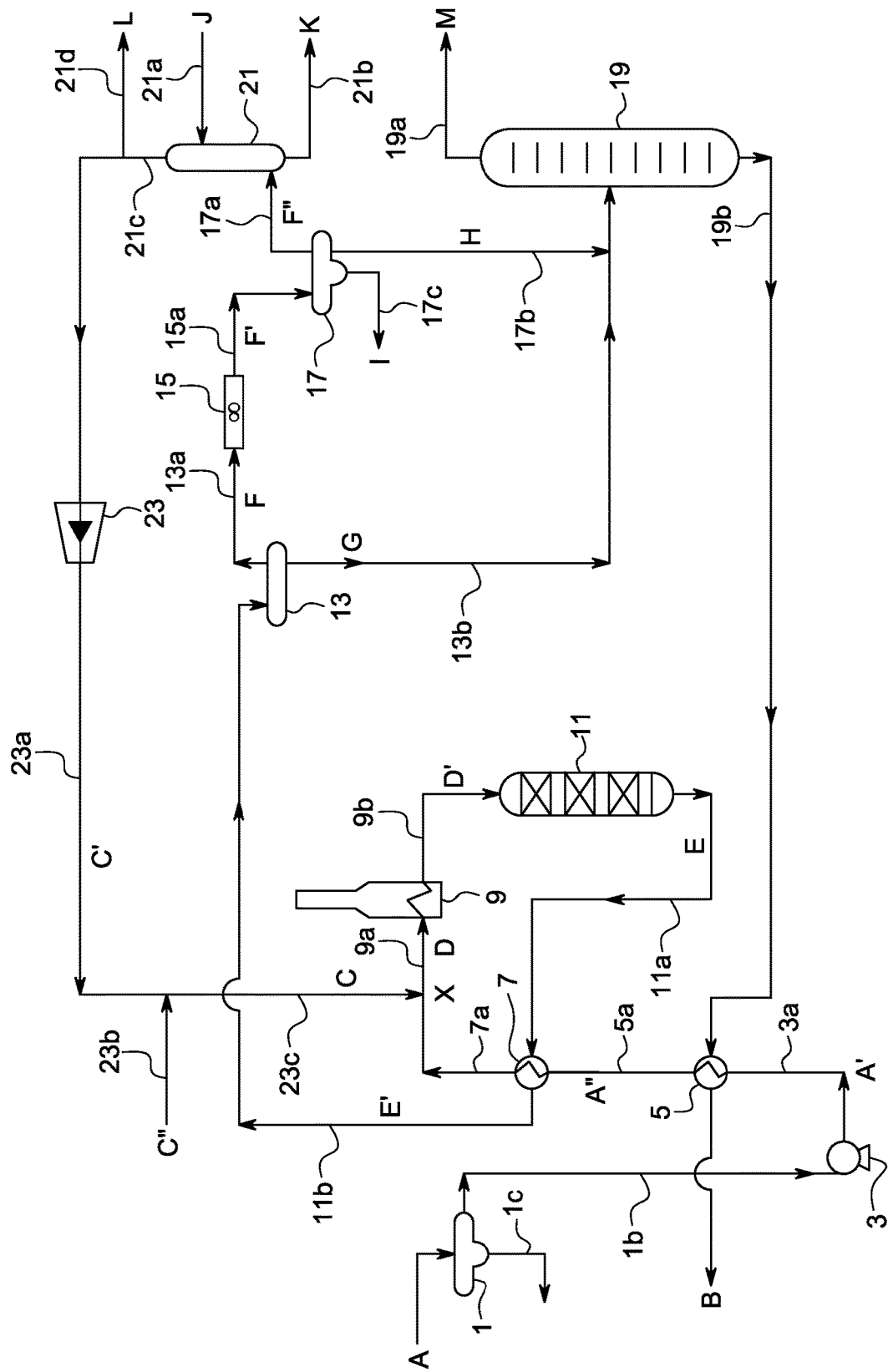
FIG. 2 is a process flow diagram of a multistage process for transforming the high sulfur Feedstock HMFO to produce Product HMFO.

Production Plant Description: Turning now to a more detailed illustrative embodiment of a production plant, FIG. 2 shows a schematic for a production plant implementing the process described above for transforming a Feedstock HMFO to produce a Product HMFO according to the second illustrative embodiment. One of skill in the art will appreciate that FIG. 2 is a generalized schematic drawing, and the exact layout and configuration of a plant will depend upon factors such as location, production capacity, environmental conditions (i.e. wind load, etc.) and other factors and elements that a skilled detailed engineering firm will be able to provide. Such variations are contemplated and within the scope of the present disclosure.

In FIG. 2, Feedstock HMFO (A) is fed from outside the battery limits (OSBL) to the Oil Feed Surge Drum (1) that receives feed from outside the battery limits (OSBL) and provides surge volume adequate to ensure smooth operation of the unit. Water entrained in the feed and bulk solids (sand, rust particles, etc.) are removed from the HMFO with the water and bulk solids being discharged a stream (1c) for treatment OSBL.

The Feedstock HMFO (A) is withdrawn from the Oil Feed Surge Drum (1) via line (1b) by the Oil Feed Pump (3)

and is pressurized to a pressure required for the process. The pressurized HMFO (A') then passes through line (3a) to the Oil Feed/Product Heat Exchanger (5) where the pressurized HMFO Feed (A') is partially heated by the Product HMFO (B). The pressurized Feedstock HMFO (A') passing through line (5a) is further heated against the effluent from the Reactor System (E) in the Reactor Feed/Effluent Heat Exchanger (7).

The heated and pressurized Feedstock HMFO (A") in line (7a) is then mixed with Activating Gas (C) provided via line (23c) at Mixing Point (X) to form a Feedstock Mixture (D). The mixing point (X) can be any well know gas/liquid mixing system or entrainment mechanism well known to one skilled in the art.

The Feedstock Mixture (D) passes through line (9a) to the Reactor Feed Furnace (9) where the Feedstock Mixture (D) is heated to the specified process temperature. The Reactor Feed Furnace (9) may be a fired heater furnace or any other kind to type of heater as known to one of skill in the art if it will raise the temperature of the Feedstock Mixture (D) to the desired temperature for the process conditions.

The fully heated Feedstock Mixture (D') exits the Reactor Feed Furnace (9) via line 9b and is fed into the Reactor System (11). The fully heated Feedstock Mixture (D') enters the Reactor System (11) where environmental contaminates, such a sulfur, nitrogen, and metals are preferentially removed from the Feedstock HMFO component of the fully heated Feedstock Mixture. The Reactor System contains a catalyst which preferentially removes the sulfur compounds in the Feedstock HMFO component by reacting them with hydrogen in the Activating Gas to form hydrogen sulfide. The Reactor System will also achieve demetallization, denitrogenation, and a certain amount of ring opening hydrogenation of the complex aromatics and asphaltenes, however minimal hydrocracking of hydrocarbons should take place. The process conditions of hydrogen partial pressure, reaction pressure, temperature and residence time as measured by liquid hourly velocity are optimized to achieve desired final product quality. A more detailed discussion of the Reactor System, the catalyst, the process conditions, and other aspects of the process are contained below in the "Reactor System Description."

The Reactor System Effluent (E) exits the Reactor System (11) via line (11a) and exchanges heat against the pressurized and partially heats the Feedstock HMFO (A') in the Reactor Feed/Effluent Exchanger (7). The partially cooled Reactor System Effluent (E') then flows via line (11c) to the Hot Separator (13).

The Hot Separator (13) separates the gaseous components of the Reactor System Effluent (F) which are directed to line (13a) from the liquid components of the Reactor System effluent (G) which are directed to line (13b). The gaseous components of the Reactor System effluent in line (13a) are cooled against air in the Hot Separator Vapor Air Cooler (15) and then flow via line (15a) to the Cold Separator (17).

The Cold Separator (17) further separates any remaining gaseous components from the liquid components in the cooled gaseous components of the Reactor System Effluent (F'). The gaseous components from the Cold Separator (F") are directed to line (17a) and fed onto the Amine Absorber (21). The Cold Separator (17) also separates any remaining Cold Separator hydrocarbon liquids (H) in line (17b) from any Cold Separator condensed liquid water (I). The Cold Separator condensed liquid water (I) is sent OSBL via line (17c) for treatment.

The hydrocarbon liquid components of the Reactor System effluent from the Hot Separator (G) in line (13b) and the Cold Separator hydrocarbon liquids (H) in line (17b) are combined and are fed to the Oil Product Stripper System (19). The Oil Product Stripper System (19) removes any residual hydrogen and hydrogen sulfide from the Product HMFO (B) which is discharged in line (19b) to storage OSBL. It is also contemplated that a second draw (not shown) may be included to withdraw a distillate product, preferably a middle to heavy distillate. The vent stream (M) from the Oil Product Stripper in line (19a) may be sent to the fuel gas system or to the flare system that are OSBL. A more detailed discussion of the Oil Product Stripper System is contained in the "Oil Product Stripper System Description."

The gaseous components from the Cold Separator (F") in line (17a) contain a mixture of hydrogen, hydrogen sulfide and light hydrocarbons (mostly methane and ethane). This vapor stream (17a) feeds an Amine Absorber System (21) where it is contacted against Lean Amine (J) provided OSBL via line (21a) to the Amine Absorber System (21) to remove hydrogen sulfide from the gases making up the Activating Gas recycle stream (C'). Rich amine (K) which has absorbed hydrogen sulfide exits the bottom of the Amine Absorber System (21) and is sent OSBL via line (21b) for amine regeneration and sulfur recovery.

The Amine Absorber System overhead vapor in line (21c) is preferably recycled to the process as a Recycle Activating Gas (C') via the Recycle Compressor (23) and line (23 a) where it is mixed with the Makeup Activating Gas (C") provided OSBL by line (23b). This mixture of Recycle Activating Gas (C') and Makeup Activating Gas (C") to form the Activating Gas (C) utilized in the process via line (23c) as noted above. A Scrubbed Purge Gas stream (H) is taken from the Amine Absorber System overhead vapor line (21c) and sent via line (21d) to OSBL to prevent the buildup of light hydrocarbons or other non-condensable hydrocarbons. A more detailed discussion of the Amine Absorber System is contained in the "Amine Absorber System Description."

Reactor System Description: The core process Reactor System (11) illustrated in FIG. 2 comprises a single reactor vessel loaded with the process catalyst and sufficient controls, valves and sensors as one of skill in the art would readily appreciate. One of skill in the art will appreciate that the reactor vessel itself must be engineered to withstand the pressures, temperatures and other conditions (i.e. presence of hydrogen and hydrogen sulfide) of the process. Using special alloys of stainless steel and other materials typical of such a unit are within the skill of one in the art and well known. As illustrated, fixed bed reactors are preferred as these are easier to operate and maintain, however other reactor types are also within the scope of the invention.

A description of the process catalyst, the selection of the process catalyst and the loading and grading of the catalyst within the reactor vessel is contained in the "Catalyst in Reactor System".

Alternative configurations for the core process Reactor System (11) are contemplated. In one illustrative configuration, more than one reactor vessel may be utilized in parallel as shown in FIG. 3 to replace the core process Reactor System (11) illustrated in FIG. 2.

Figure 3:
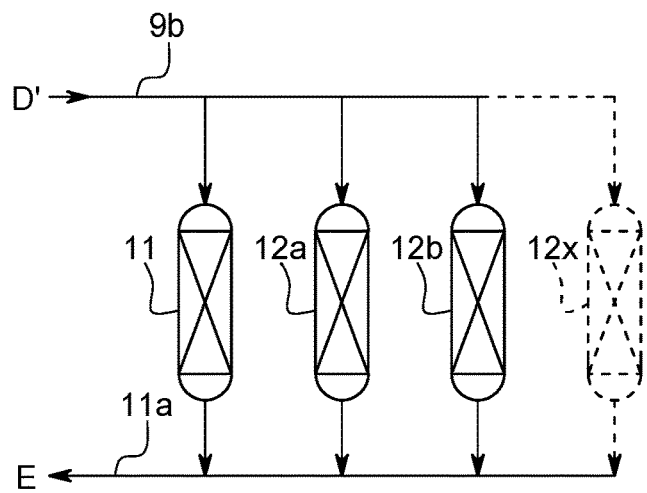
FIG. 3 is a process flow diagram of a first alternative configuration for the reactor Section (11) for the process in FIG. 2.

In the embodiment shown in FIG. 3, each reactor vessel is loaded with process catalyst in a similar manner and each reactor vessel in the Reactor System is provided the heated Feed Mixture (D') via a common line 9b. The effluent from each reactor vessel in the Reactor System is recombined and forms a combined Reactor Effluent (E) for further processing as described above via line 11a. The illustrated arrangement will allow the three reactors to carry out the process effectively multiplying the hydraulic capacity of the overall Reactor System. Control valves and isolation valves may also prevent feed from entering one reactor vessel but not another reactor vessel. In this way one reactor can be by-passed and placed off-line for maintenance and reloading of catalyst while the remaining reactors continues to receive heated Feedstock Mixture (D'). It will be appreciated by one of skill in the art this arrangement of reactor vessels in parallel is not limited in number to three, but multiple additional reactor vessels can be added as shown by dashed line reactor. The only limitation to the number of parallel reactor vessels is plot spacing and the ability to provide heated Feedstock Mixture (D') to each active reactor.

Figure 4:
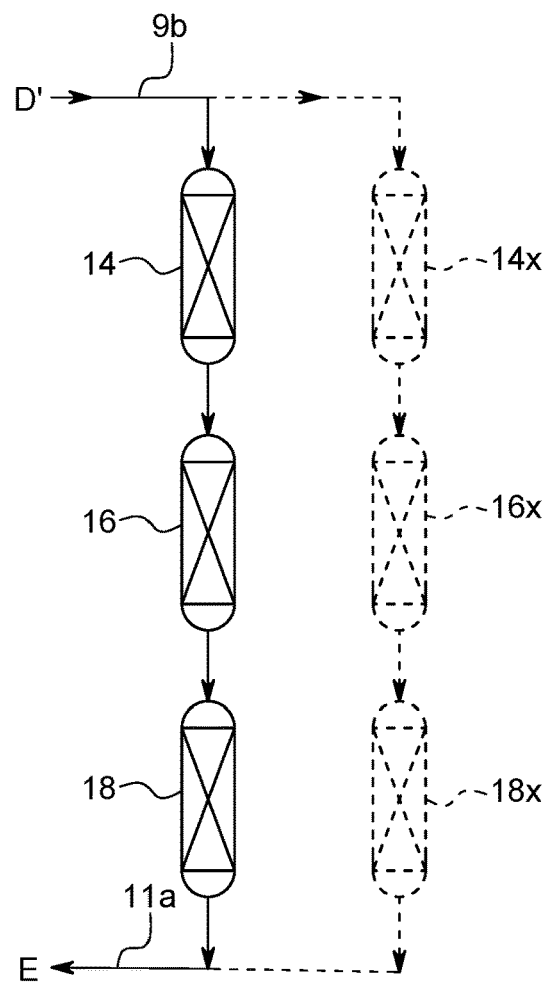
FIG. 4 is a process flow diagram of a second alternative configuration for the reactor Section (11) for the process in FIG. 2.

A cascading series as shown in FIG. 4 can also be substituted for the single reactor vessel Reactor System 11 in FIG. 2. The cascading reactor vessels are loaded with process catalyst with the same or different activities toward metals, sulfur or other environmental contaminates to be removed. For example, one reactor may be loaded with a highly active demetallization catalyst, a second subsequent or downstream reactor may be loaded with a balanced demetallization/desulfurizing catalyst, and reactor downstream from the second reactor may be loaded with a highly active desulfurization catalyst. This allows for greater control and balance in process conditions (temperature, pressure, space flow velocity, etc. . . . ) so it is tailored for each catalyst. In this way one can optimize the parameters in each reactor depending upon the material being fed to that specific reactor/catalyst combination and minimize the hydrocracking reactions.

Figure 5:
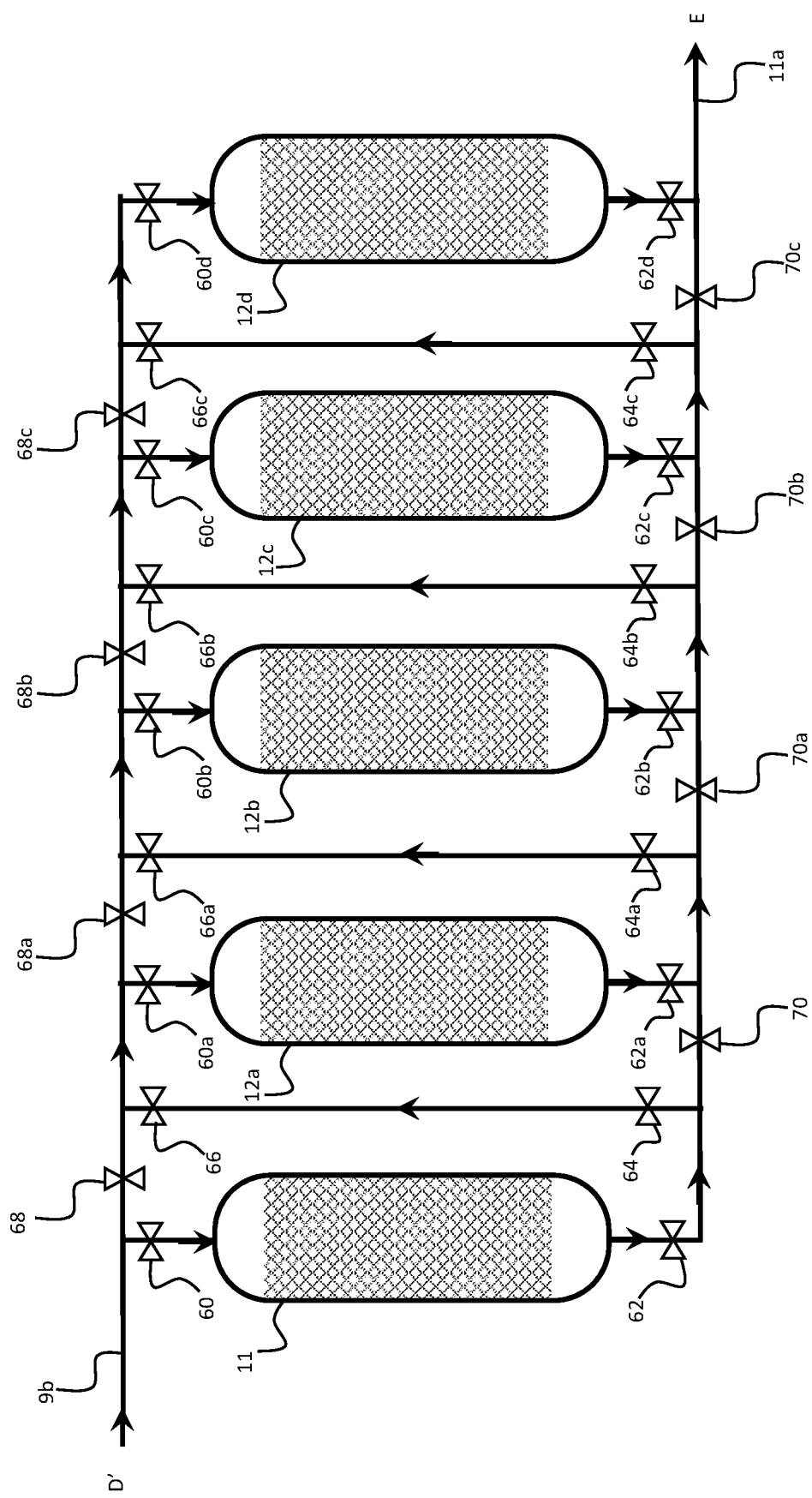
FIG. 5 is a process flow diagram of a third alternative multi-reactor configuration for the Reactor System (11) in FIG. 2.

An alternative implementation of the parallel reactor concept is illustrated in greater detail in FIG. 5. Heated Feed Mixture is provided to the reactor System via line 9b and is distributed amongst multiple reactor vessels (11, 12a, 12b, 12c and 12d). Flow of heated Feedstock to each reactor vessel is controlled by reactor inlet valves (60, 60a, 60b, 60c, and 60d) associated with each reactor vessel respectively. Reactor Effluent from each reactor vessel is controlled by a reactor outlet valve (62, 62a, 62b, 62c and 62d) respectively. Line 9b has multiple inflow diversion control valves (68, 68a, 68b and 68c), the function and role of which will be described below. Line 11a serves to connect the outlet of each reactor, and like Line 9b has multiple outflow diversion control valves (70, 70a, 70b and 70c) the function and role of which will be described below. Also shown is a by-pass line defined by lower by-pass control valve (64 64a, 64b, 64c) and upper by-pass control valve (66, 66a, 66b and 66c), between line 9b and line 11a the function and purpose of which will be described below.

One of skill in the art upon careful review of the illustrated configuration will appreciate that multiple flow schemes and configurations can be achieved with the illustrated arrangement of reactor vessels, control valves and interconnected lines forming the reactor System. For example, in one configuration one can: open all of inflow diversion control valves (68, 68a, 68b and 68c); open all of the reactor inlet valves (60, 60a, 60b, 60c, and 60d); open all of the reactor outlet valves 62, 62a, 62b, 62c and 62d; open all of the outflow diversion control valves (70, 70a, 70b and 70c); and close lower by-pass control valve (64 64a, 64b, 64c) and upper by-pass control valve (66, 66a, 66b and 66c), to substantially achieve a reactor configuration of five parallel reactors each receiving fully heated Feedstock from line 9b and discharging Reactor Effluent into line 11a. In such a configuration, all of the reactors are loaded with catalyst in substantially the same manner. One of skill in the art will also appreciate that closing of an individual reactor inlet valve and corresponding reactor outlet valve (for example closing reactor inlet vale 60 and closing reactor outlet valve 62) effectively isolates the reactor vessel 11. This will allow for the isolated reactor vessel 11 to be brought off line and serviced and or reloaded with catalyst while the remaining reactors continue to transform Feedstock HMFO into Product HMFO.

A second illustrative configuration of the control valves allows for the reactors to work in series as shown in FIG. 4 by using the by-pass lines. In such an illustrative embodiment, inflow diversion control valve 68 is closed and reactor inlet valve 60 is open. Reactor 11 is loaded with demetallization catalyst and the effluent from the reactor exits via open outlet control valve 62. The closing of outflow diversion control valve 70, the opening of lower by-pass control valve 64 and upper by-pass control valve 66, the opening of reactor inlet valve 60a and closing of inflow diversion control valve 68a re-routes the effluent from reactor 11 to become the feed for reactor 12a. reactor 12a may be loaded with additional demetallization catalyst, or a transition catalyst loading or a desulfurization catalyst loading. One of skill in the art will quickly realize and appreciate that this configuration can be extended to the other reactors 12b, 12c and 12d, thus allowing for a wide range of flow configurations and flow patterns through the Reactor Section. As previously noted, an advantage of this illustrative embodiment of the Reactor Section is that it allows for any one reactor to be taken off-line, serviced and brought back on line without disrupting the transformation of Feedstock HMFO to Product HMFO. It will also allow a plant to adjust its configuration so that as the composition of the feedstock HMFO changes, the reactor configuration (number of stages) and catalyst types can be adjusted. For example a high metal containing Feedstock, such as a Ural residual based HMFO, may require two or three reactors (i.e. reactors 11, 12a and 12b) loaded with demetallization catalyst and working in series while reactor 12c is loaded with transition catalyst and reactor 12d is loaded with desulfurization catalyst. A large number of permutations and variations can be achieved by opening and closing control valves as needed and adjusting the catalyst loadings in each of the reactor vessels by one of skill in the art and only for the sake of brevity need not be described in detail.

Figure 6:
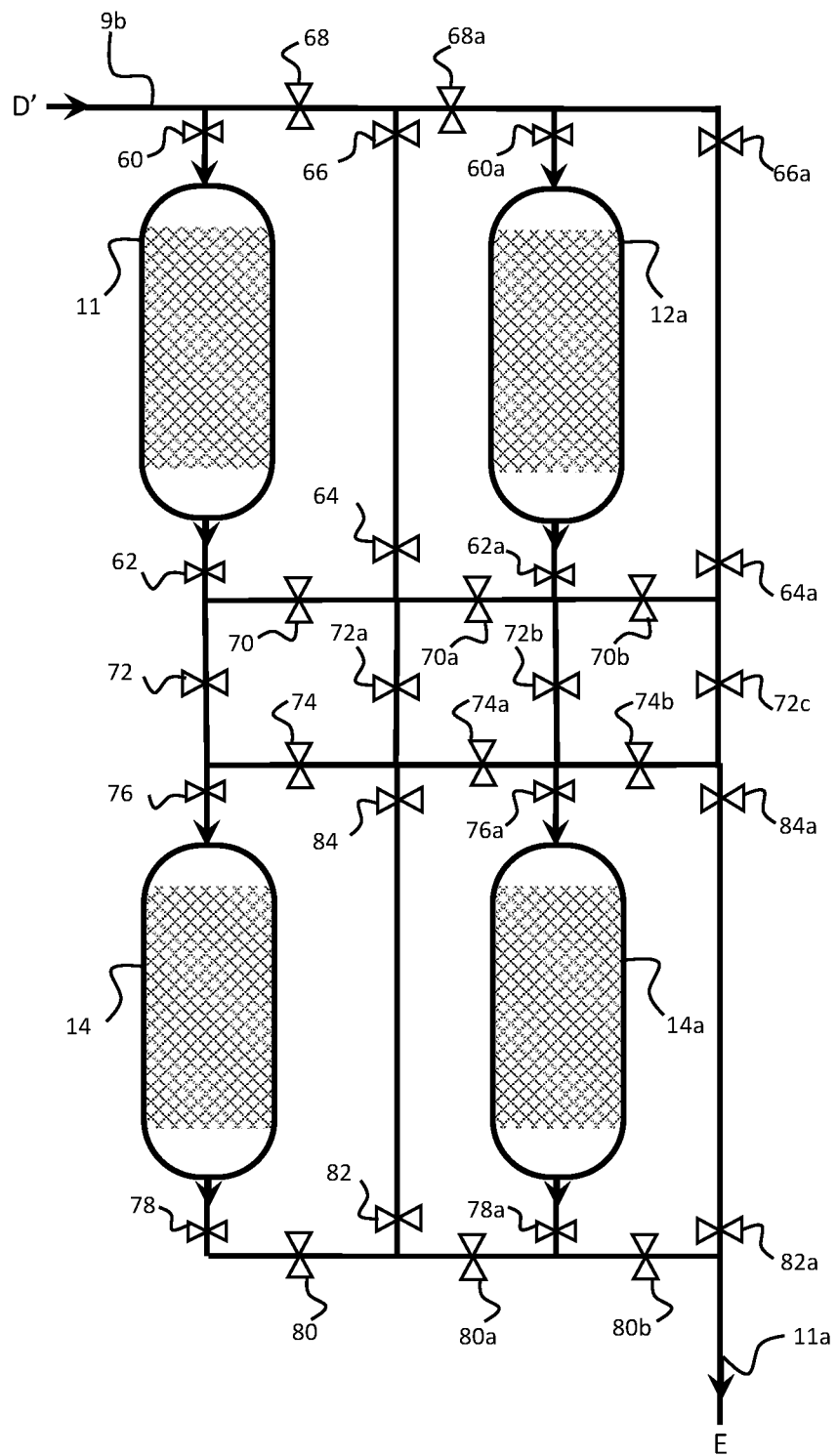
FIG. 6 is a process flow diagram of a fourth alternative multi-reactor matrix configuration for the Reactor System (11) in FIG. 2.

Another illustrative embodiment of the replacement of the single reactor vessel Reactor System 11 in FIG. 2 is a matrix of reactors composed of interconnected reactors in parallel and in series. A simple 2×2 matrix arrangement of reactors with associated control valves and piping is shown in FIG. 6, however a wide variety of matrix configurations such as 2×3; 3×3, etc. . . . are contemplated and within the scope of the present invention. As depicted in FIG. 6, a 2 reactor by 2 reactor (2×2) matrix of comprises four reactor vessels (11, 12a, 14 and 14b) each with reactor inlet control valves (60, 60a, 76, and 76a) and reactor outlet control valves (62, 62a, 78 and 78a) associated with each vessel. Horizontal flow control valves (68, 68a, 70, 70a, 70b, 74, 74a, 74b, 80, 80a, and 80b) regulate the flow across the matrix from heated Feedstock (D') in line 9b to discharging Reactor Effluent (E) into line 11a. Vertical flow control valves (64, 64a, 66, 66a, 72, 72a, 72b, 72c, 82, 82a, 84, and 84b) control the flow through the matrix from line 9b to line 11a. One of skill in the art will quickly realize and appreciate that by opening and closing the valves and varying the catalyst loads present in each reactor, a large number of configurations may be achieved. One such configuration would be to open valves numbered: 60, 62, 72, 76, 78, 80, 82, 84, 72a, 64, 66, 68a, 60a, 62a, 72b, 76a, 78a, and 80b, with all other valves closed such that the flow for Feedstock will pass through reactors 11, 14, 12a and 14a in series. Another such configuration would be to open valves numbered: 60, 62, 70, 64, 66, 68a, 60a, 62a, 72b, 76a, 78a, and 80b, with all other valves closed such that the flow of Feedstock will pass through reactors 11, 12a and 14a (but not 14). As with the prior example, the nature of the Feedstock and the catalyst loaded in each reactor may be optimized and adjusted to achieve the desired Product HSFO properties, however for brevity of disclose all such variations will be apparent to one of skill in the art.

One of the benefits of having a multi-reactor Reactor System is that it allows for a reactor that is experiencing decreased activity or plugging as a result of coke formation to be isolated and taken off line for turn-around (i.e. deactivated, catalyst and internals replaced, etc. . . . ) without the entire plant having to shut down. Another benefit as noted above is that it allows one to vary the catalyst loading in the Reactor System so that the overall process can be optimized for a specific feedstock. A further benefit is that one can design the piping, pumps, heaters/heat exchangers, etc. . . . to have excess capacity so that when an increase in capacity is desired, additional reactors can be quickly brought on-line. Conversely, it allows an operator to take capacity off line, or turn down a plant output without having a concern about turn down and minimum flow through a reactor.

Catalyst in Reactor System: The reactor vessel in each Reactor System is loaded with one or more process catalysts. The exact design of the process catalyst system is a function of feedstock properties, product requirements and operating constraints and optimization of the process catalyst can be carried out by routine trial and error by one of ordinary skill in the art.

The process catalyst(s) comprise at least one metal selected from the group consisting of the metals each belonging to the groups 6, 8, 9 and 10 of the Periodic Table, and more preferably a mixed transition metal catalyst such as Ni—Mo, Co—Mo, Ni—W or Ni—Co—Mo are utilized. The metal is preferably supported on a porous inorganic oxide catalyst carrier. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, aluminaltitania carrier and alumina/zirconia carrier. The preferred porous inorganic oxide catalyst carrier is alumina. The pore size and metal loadings on the carrier may be systematically varied and tested with the desired feedstock and process conditions to optimize the properties of the Product HMFO. One of skill in the art knows that demetallization using a transition metal catalyst (such a CoMO or NiMo) is favored by catalysts with a relatively large surface pore diameter and desulfurization is favored by supports having a relatively small pore diameter. Generally the surface area for the catalyst material ranges from 200-300 $m^2/g$. The systematic adjustment of pore size and surface area, and transition metal loadings activities to preferentially form a demetallization catalyst or a desulfurization catalyst are well known and routine to one of skill in the art. Catalyst in the fixed bed reactor(s) may be dense-loaded or sock-loaded and the inclusion of inert materials (such as glass or ceric balls) may be needed to ensure the desired porosity.

The catalyst selection utilized within and for loading the Reactor System may be preferential to desulfurization by designing a catalyst loading scheme that results in the Feedstock mixture first contacting a catalyst bed that with a catalyst preferential to demetallization followed downstream by a bed of catalyst with mixed activity for demetallization and desulfurization followed downstream by a catalyst bed with high desulfurization activity. In effect the first bed with high demetallization activity acts as a guard bed for the desulfurization bed.

The objective of the Reactor System is to treat the Feedstock HMFO at the severity required to meet the Product HMFO specification. Demetallization, denitrogenation and hydrocarbon hydrogenation reactions may also occur to some extent when the process conditions are optimized so the performance of the Reactor System achieves the required level of desulfurization. Hydrocracking is preferably minimized to reduce the volume of hydrocarbons formed as by-product hydrocarbons to the process. The objective of the process is to selectively remove the environmental contaminates from Feedstock HMFO and minimize the formation of unnecessary by-product hydrocarbons (C1-C8 hydrocarbons).

The process conditions in each reactor vessel will depend upon the feedstock, the catalyst utilized and the desired properties of the Product HMFO. Variations in conditions are to be expected by one of ordinary skill in the art and these may be determined by pilot plant testing and systematic optimization of the process. With this in mind it has been found that the operating pressure, the indicated operating temperature, the ratio of the Activating Gas to Feedstock HMFO, the partial pressure of hydrogen in the Activating Gas and the space velocity all are important parameters to consider. The operating pressure of the Reactor System should be in the range of 250 psig and 3000 psig, preferably between 1000 psig and 2500 psig and more preferably between 1500 psig and 2200 psig. The indicated operating temperature of the Reactor System should be 500° F. to 900° F., preferably between 650° F. and 850° F. and more preferably between 680° F. and 800° F. The ratio of the quantity of the Activating Gas to the quantity of Feedstock HMFO should be in the range of 250 scf gas/bbl of Feedstock HMFO to 10,000 scf gas/bbl of Feedstock HMFO, preferably between 2000 scf gas/bbl of Feedstock HMFO to 5000 scf gas/bbl of Feedstock HMFO and more preferably between 2500 scf gas/bbl of Feedstock HMFO to 4500 scf gas/bbl of Feedstock HMFO. The Activating Gas should be selected from mixtures of nitrogen, hydrogen, carbon dioxide, gaseous water, and methane, so Activating Gas has an ideal gas partial pressure of hydrogen ($p_{H2}$) greater than 80% of the total pressure of the Activating Gas mixture (P) and preferably wherein the Activating Gas has an ideal gas partial pressure of hydrogen ($p_{H2}$) greater than 90% of the total pressure of the Activating Gas mixture (P). The Activating Gas may have a hydrogen mole fraction in the range between 80% of the total moles of Activating Gas mixture and more preferably wherein the Activating Gas has a hydrogen mole fraction between 80% and 100% of the total moles of Activating Gas mixture. The liquid hourly space velocity within the Reactor System should be between 0.05 oil/hour/$m^3$ catalyst and 1.0 oil/hour/$m^3$ catalyst; preferably between 0.08 oil/hour/$m^3$ catalyst and 0.5 oil/hour/$m^3$ catalyst and more preferably between 0.1 oil/hour/$m^3$ catalyst and 0.3 oil/hour/$m^3$ catalyst to achieve deep desulfurization with product sulfur levels below 0.1 ppmw.

The hydraulic capacity rate of the Reactor System should be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day. The desired hydraulic capacity may be achieved in a single reactor vessel Reactor System or in a multiple reactor vessel Reactor System as described.

Oil Product Stripper System Description: The Oil Product Stripper System (19) comprises a stripper column (also known as a distillation column or exchange column) and ancillary equipment including internal elements and utilities required to remove hydrogen, hydrogen sulfide and light hydrocarbons lighter than diesel from the Product HMFO. Such systems are well known to one of skill in the art, see U.S. Pat. Nos. 6,640,161; 5,709,780; 5,755,933; 4,186,159; 3,314,879 U.S. Pat. Nos. 3,844,898; 4,681,661; or U.S. Pat. No. 3,619,377 the contents of which are incorporated herein by reference, a generalized functional description is provided herein. Liquid from the Hot Separator (13) and Cold Separator (7) feed the Oil Product Stripper Column (19). Stripping of hydrogen and hydrogen sulfide and light hydrocarbons lighter than diesel may be achieved via a reboiler, live steam or other stripping medium. The Oil Product Stripper System (19) may be designed with an overhead system comprising an overhead condenser, reflux drum and reflux pump or it may be designed without an overhead system. The conditions of the Oil Product Stripper may be optimized to control the bulk properties of the Product HMFO, more specifically viscosity and density. It is also contemplated that a second draw (not shown) may be included to withdraw a distillate product, preferably a middle to heavy distillate.

Amine Absorber System Description: The Amine Absorber System (21) comprises a gas liquid contacting column and ancillary equipment and utilities required to remove sour gas (i.e. hydrogen sulfide) from the Cold Separator vapor feed so the resulting scrubbed gas can be recycled and used as Activating Gas. Because such systems are well known to one of skill in the art, see U.S. Pat. Nos. 4,425,317; 4,085,199; 4,080,424; 4,001,386; which are incorporated herein by reference, a generalized functional description is provided herein. Vapors from the Cold Separator (17) feed the contacting column/system (19). Lean Amine (or other suitable sour gas stripping fluids or systems) provided from OSBL is utilized to scrub the Cold Separator vapor so hydrogen sulfide is effectively removed. The Amine Absorber System (19) may be designed with a gas drying system to remove the any water vapor entrained into the Recycle Activating Gas (C'). The absorbed hydrogen sulfide is processed using conventional means OSBL in a tail gas treating unit, such as a Claus combustion sulfur recovery unit or sulfur recovery system that generates sulfuric acid.

The following examples will provide one skilled in the art with a more specific illustrative embodiment for conducting the process disclosed and claimed herein:

Example 1

Overview: The purpose of a pilot test run is to demonstrate that feedstock HMFO can be processed through a reactor loaded with commercially available catalysts at specified conditions to remove environmental contaminates, specifically sulfur and other contaminants from the HMFO to produce a product HMFO that is MARPOL compliant, that is production of a Low Sulfur Heavy Marine Fuel Oil (LS-HMFO) or Ultra-Low Sulfur Heavy Marine Fuel Oil (USL-HMFO).

Pilot Unit Set Up: The pilot unit will be set up with two 434 cm 3 reactors arranged in series to process the feedstock HMFO. The lead reactor will be loaded with a blend of a commercially available hydrodemetallization (HDM) catalyst and a commercially available hydro-transition (HDT) catalyst. One of skill in the art will appreciate that the HDT catalyst layer may be formed and optimized using a mixture of HDM and HDS catalysts combined with an inert material to achieve the desired intermediate/transition activity levels. The second reactor will be loaded with a blend of the commercially available hydro-transition (HDT) and a commercially available hydrodesulfurization (HDS). Alternatively, one can load the second reactor simply with a commercially hydrodesulfurization (HDS) catalyst. One of skill in the art will appreciate that the specific feed properties of the Feedstock HMFO may affect the proportion of HDM, HDT and HDS catalysts in the reactor system. A systematic process of testing different combinations with the same feed will yield the optimized catalyst combination for any feedstock and reaction conditions. For this example, the first reactor will be loaded with ⅔ hydrodemetallization catalyst and ⅓ hydro-transition catalyst. The second reactor will be loaded with all hydrodesulfurization catalyst. The catalysts in each reactor will be mixed with glass beads (approximately 50% by volume) to improve liquid distribution and better control reactor temperature. For this pilot test run, one should use these commercially available catalysts: HDM: Albemarle KFR 20 series or equivalent; HDT: Albemarle KFR 30 series or equivalent; HDS: Albemarle KFR 50 or KFR 70 or equivalent. Once set up of the pilot unit is complete, the catalyst can be activated by sulfiding the catalyst using dimethyldisulfide (DMDS) in a manner well known to one of skill in the art.

Pilot Unit Operation: Upon completion of the activating step, the pilot unit will be ready to receive the feedstock HMFO and Activating Gas feed. For the present example, the Activating Gas can be technical grade or better hydrogen gas. The mixed Feedstock HMFO and Activating Gas will be provided to the pilot plant at rates and operating conditions as specified: Oil Feed Rate: 108.5 ml/h (space velocity=0.25/h); Hydrogen/Oil Ratio: 570 Nm3/m3 (3200 scf/bbl); Reactor Temperature: 372° C. (702° F.); Reactor Outlet Pressure: 13.8 MPa(g) (2000 psig).

One of skill in the art will know that the rates and conditions may be systematically adjusted and optimized depending upon feed properties to achieve the desired product requirements. The unit will be brought to a steady state for each condition and full samples taken so analytical tests can be completed. Material balance for each condition should be closed before moving to the next condition.

Expected impacts on the Feedstock HMFO properties are: Sulfur Content (wt %): Reduced by at least 80%; Metals Content (wt %): Reduced by at least 80%; MCR/Asphaltene Content (wt %): Reduced by at least 30%; Nitrogen Content (wt %): Reduced by at least 20%; C1-Naphtha Yield (wt %): Not over 3.0% and preferably not over 1.0%. 089. Process conditions in the Pilot Unit can be systematically adjusted as per Table 4 to assess the impact of process conditions and optimize the performance of the process for the specific catalyst and feedstock HMFO utilized.

TABLE 4

Optimization of Process Conditions

| Case | HC Feed Rate (ml/h), [LHSV(/h)] | Nm³ H₂/m³ oil/ scf H₂/bbl oil | Temp (° C./° F.) | Pressure (MPa (g)/psig) |
|---|---|---|---|---|
| Baseline | 108.5 [0.25] | 570/3200 | 372/702 | 13.8/2000 |
| T1 | 108.5 [0.25] | 570/3200 | 362/684 | 13.8/2000 |
| T2 | 108.5 [0.25] | 570/3200 | 382/720 | 13.8/2000 |

TABLE 4-continued

Optimization of Process Conditions

| Case | HC Feed Rate (ml/h), [LHSV(/h)] | Nm³ H₂/m³ oil/ scf H₂/bbl oil | Temp (° C./° F.) | Pressure (MPa (g)/psig) |
|---|---|---|---|---|
| L1 | 130.2 [0.30] | 570/3200 | 372/702 | 13.8/2000 |
| L2 | 86.8 [0.20] | 570/3200 | 372/702 | 13.8/2000 |
| H1 | 108.5 [0.25] | 500/2810 | 372/702 | 13.8/2000 |
| H2 | 108.5 [0.25] | 640/3590 | 372/702 | 13.8/2000 |
| S1 | 65.1 [0.15] | 620/3480 | 385/725 | 15.2/2200 |

In this way, the conditions of the pilot unit can be optimized to achieve less than 0.5% wt. sulfur product HMFO and preferably a 0.1% wt. sulfur product HMFO. Conditions for producing ULS-HMFO (i.e. 0.1% wt. sulfur product HMFO) will be: Feedstock HMFO Feed Rate: 65.1 ml/h (space velocity=0.15/h); Hydrogen/Oil Ratio: 620 Nm³/m³ (3480 scf/bbl); Reactor Temperature: 385° C. (725° F.); Reactor Outlet Pressure: 15 MPa(g) (2200 psig)

Table 5 summarizes the anticipated impacts on key properties of HMFO.

TABLE 5

Expected Impact of Process on Key Properties of HMFO

| Property | Minimum | Typical | Maximum |
|---|---|---|---|
| Sulfur Conversion/Removal | 80% | 90% | 98% |
| Metals Conversion/Removal | 80% | 90% | 100% |
| MCR Reduction | 30% | 50% | 70% |
| Asphaltene Reduction | 30% | 50% | 70% |
| Nitrogen Conversion | 10% | 30% | 70% |
| C1 through Naphtha Yield | 0.5% | 1.0% | 4.0% |
| Hydrogen Consumption (scf/bbl) | 500 | 750 | 1500 |

Table 6 lists analytical tests to be carried out for the characterization of the Feedstock HMFO and Product HMFO. The analytical tests include those required by ISO for the Feedstock HMFO and the product HMFO to qualify and trade in commerce as ISO compliant residual marine fuels. The additional parameters are provided so that one skilled in the art will be able to understand and appreciate the effectiveness of the inventive process.

TABLE 6

Analytical Tests and Testing Procedures

| | |
|---|---|
| Sulfur Content | ISO 8754 or ISO 14596 or ASTM D4294 |
| Density @ 15° C. | ISO 3675 or ISO 12185 |
| Kinematic Viscosity @ 50° C. | ISO 3104 |
| Pour Point, ° C. | ISO 3016 |
| Flash Point, ° C. | ISO 2719 |
| CCAI | ISO 8217, ANNEX B |
| Ash Content | ISO 6245 |
| Total Sediment - Aged | ISO 10307-2 |
| Micro Carbon Residue, mass % | ISO 10370 |
| H2S, mg/kg | IP 570 |
| Acid Number | ASTM D664 |
| Water | ISO 3733 |
| Specific Contaminants | IP 501 or IP 470 (unless indicated otherwise) |
| Vanadium | |
| Sodium | |
| Aluminum | or ISO 10478 |
| Silicon | or ISO 10478 |
| Calcium | or IP 500 |

TABLE 6-continued

Analytical Tests and Testing Procedures

| | |
|---|---|
| Zinc | or IP 500 |
| Phosphorous | IP 500 |
| Nickle | |
| Iron | |
| Distillation | ASTM D7169 |
| C:H Ratio | ASTM D3178 |
| SARA Analysis | ASTM D2007 |
| Asphaltenes, wt % | ASTM D6560 |
| Total Nitrogen | ASTM D5762 |
| Vent Gas Component Analysis | FID Gas Chromatography or comparable |

Table 7 contains the Feedstock HMFO analytical test results and the Product HMFO analytical test results expected from the inventive process that indicate the production of a LS HMFO. It will be noted by one of skill in the art that under the conditions, the levels of hydrocarbon cracking will be minimized to levels substantially lower than 10%, more preferably less than 5% and even more preferably less than 1% of the total mass balance.

TABLE 7

Analytical Results

| | Feedstock HMFO | Product HMFO |
|---|---|---|
| Sulfur Content, mass % | 3.0 | 0.3 |
| Density @ 15° C., kg/m³ | 990 | 950 [1] |
| Kinematic Viscosity @ 50° C., mm²/s | 380 | 100 [1] |
| Pour Point, ° C. | 20 | 10 |
| Flash Point, ° C. | 110 | 100 [1] |
| CCAI | 850 | 820 |
| Ash Content, mass % | 0.1 | 0.0 |
| Total Sediment - Aged, mass % | 0.1 | 0.0 |
| Micro Carbon Residue, mass % | 13.0 | 6.5 |
| H2S, mg/kg | 0 | 0 |
| Acid Number, mg KO/g | 1 | 0.5 |
| Water, vol % | 0.5 | 0 |
| Specific Contaminants, mg/kg | | |
| Vanadium | 180 | 20 |
| Sodium | 30 | 1 |
| Aluminum | 10 | 1 |
| Silicon | 30 | 3 |
| Calcium | 15 | 1 |
| Zinc | 7 | 1 |
| Phosphorous | 2 | 0 |
| Nickle | 40 | 5 |
| Iron | 20 | 2 |
| Distillation, ° C./° F. | | |
| IBP | 160/320 | 120/248 |
| 5% wt | 235/455 | 225/437 |
| 10% wt | 290/554 | 270/518 |
| 30% wt | 410/770 | 370/698 |
| 50% wt | 540/1004 | 470/878 |
| 70% wt | 650/1202 | 580/1076 |
| 90% wt | 735/1355 | 660/1220 |
| FBP | 820/1508 | 730/1346 |
| C:H Ratio (ASTM D3178) | 1.2 | 1.3 |
| SARA Analysis | | |
| Saturates | 16 | 22 |
| Aromatics | 50 | 50 |
| Resins | 28 | 25 |
| Asphaltenes | 6 | 3 |
| Asphaltenes, wt % | 6.0 | 2.5 |
| Total Nitrogen, mg/kg | 4000 | 3000 |

Note:
[1] It is expected that property will be adjusted to a higher vaue by post process removal of light material via distillation or stripping from product HMFO.

The product HMFO produced by the inventive process will reach ULS HMFO limits (i.e. 0.1% wt. sulfur product HMFO) by systematic variation of the process parameters, for example by a lower space velocity or by using a Feedstock HMFO with a lower initial sulfur content. The resulting product will make a ideal feedstock for anode or needle coking.

Example 2: RMG-380 HMFO

Pilot Unit Set Up: A pilot unit was set up as noted above in Example 1 with the following changes: the first reactor was loaded with: as the first (upper) layer encountered by the feedstock 70% vol Albemarle KFR 20 series hydrodemetallization catalyst and 30% vol Albemarle KFR 30 series hydro-transition catalyst as the second (lower) layer. The second reactor was loaded with 20% Albemarle KFR 30 series hydrotransition catalyst as the first (upper) layer and 80% vol hydrodesulfurization catalyst as the second (lower) layer. The catalyst was activated by sulfiding the catalyst with dimethyldisulfide (DMDS) in a manner well known to one of skill in the art.

Pilot Unit Operation: Upon completion of the activating step, the pilot unit was ready to receive the feedstock HMFO and Activating Gas feed. The Activating Gas was technical grade or better hydrogen gas. The Feedstock HMFO was a commercially available and merchantable ISO 8217 (2017) compliant HMFO, except for a high sulfur content (2.9 wt %). The mixed Feedstock HMFO and Activating Gas was provided to the pilot plant at rates and conditions as specified in Table 8 below. The conditions were varied to optimize the level of sulfur in the product HMFO material.

TABLE 8

Process Conditions

| Case | HC Feed Rate (ml/h), [LHSV(/h)] | Nm³ H₂/ m³ oil/scf H₂/bbl oil | Temp (° C./° F.) | Pressure (MPa (g)/ psig) | Product HMFO Sulfur % wt. |
|---|---|---|---|---|---|
| Baseline | 108.5 [0.25] | 570/3200 | 371/700 | 13.8/2000 | 0.24 |
| T1 | 108.5 [0.25] | 570/3200 | 362/684 | 13.8/2000 | 0.53 |
| T2 | 108.5 [0.25] | 570/3200 | 382/720 | 13.8/2000 | 0.15 |
| L1 | 130.2 [0.30] | 570/3200 | 372/702 | 13.8/2000 | 0.53 |
| S1 | 65.1 [0.15] | 620/3480 | 385/725 | 15.2/2200 | 0.10 |
| P1 | 108.5 [0.25] | 570/3200 | 371/700 | /1700 | 0.56 |
| T2/P1 | 108.5 [0.25] | 570/3200 | 382/720 | /1700 | 0.46 |

Analytical data for a representative sample of the feedstock HMFO and representative samples of product HMFO are provided below:

TABLE 7

Analytical Results - HMFO (RMG-380)

| | Feedstock | Product | Product |
|---|---|---|---|
| Sulfur Content, mass % | 2.9 | 0.3 | 0.1 |
| Density @ 15° C., kg/m³ | 988 | 932 | 927 |
| Kinematic Viscosity @ 50° C., mm²/s | 382 | 74 | 47 |
| Pour Point, ° C. | −3 | −12 | −30 |
| Flash Point, ° C. | 116 | 96 | 90 |
| CCAI | 850 | 812 | 814 |
| Ash Content, mass % | 0.05 | 0.0 | 0.0 |
| Total Sediment - Aged, mass % | 0.04 | 0.0 | 0.0 |
| Micro Carbon Residue, mass % | 11.5 | 3.3 | 4.1 |
| H2S, mg/kg | 0.6 | 0 | 0 |
| Acid Number, mg KO/g | 0.3 | 0.1 | >0.05 |
| Water, vol % | 0 | 0.0 | 0.0 |
| Specific Contaminants, mg/kg | | | |
| Vanadium | 138 | 15 | <1 |
| Sodium | 25 | 5 | 2 |
| Aluminum | 21 | 2 | <1 |
| Silicon | 16 | 3 | 1 |
| Calcium | 6 | 2 | <1 |
| Zinc | 5 | <1 | <1 |
| Phosphorous | <1 | 2 | 1 |
| Nickle | 33 | 23 | 2 |
| Iron | 24 | 8 | 1 |
| Distillation, ° C./° F. | | | |
| IBP | 178/352 | 168/334 | 161/322 |
| 5% wt | 258/496 | 235/455 | 230/446 |
| 10% wt | 298/569 | 270/518 | 264/507 |
| 30% wt | 395/743 | 360/680 | 351/664 |
| 50% wt | 517/962 | 461/862 | 439/822 |
| 70% wt | 633/1172 | 572/1062 | 552/1026 |
| 90% wt | >720/>1328 | 694/1281 | 679/1254 |
| FBP | >720/>1328 | >720/>1328 | >720/>1328 |
| C:H Ratio (ASTM D3178) | 1.2 | 1.3 | 1.3 |
| SARA Analysis | | | |
| Saturates | 25.2 | 28.4 | 29.4 |
| Aromatics | 50.2 | 61.0 | 62.7 |
| Resins | 18.6 | 6.0 | 5.8 |
| Asphaltenes | 6.0 | 4.6 | 2.1 |
| Asphaltenes, wt % | 6.0 | 4.6 | 2.1 |
| Total Nitrogen, mg/kg | 3300 | 1700 | 1600 |

As noted above in Table 7, both feedstock HMFO and product HMFO exhibited observed bulk properties consistent with ISO 8217 (2017) for a merchantable residual marine fuel oil, except that the sulfur content of the product HMFO was significantly reduced as noted above when compared to the feedstock HMFO.

One of skill in the art will appreciate that the above product HMFO produced by the inventive process has achieved not only an ISO 8217 (2017) compliant LS HMFO (i.e. 0.5% wt. sulfur) but also an ISO 8217 (2017) compliant ULS HMFO limits (i.e. 0.1% wt. sulfur) product HMFO. This material will make an excellent feedstock for needle coking or processing in an FCC unit.

Example 3: RMK-500 HMFO

The feedstock to the pilot reactor utilized in example 2 above was changed to a commercially available and merchantable ISO 8217 (2017) RMK-500 compliant HMFO, except that it has high environmental contaminates (i.e. sulfur (3.3 wt %)). Other bulk characteristic of the RMK-500 feedstock high sulfur HMFO are provide below:

TABLE 8

Analytical Results - Feedstock HMFO (RMK-500)

| Sulfur Content, mass % | 3.3 |
|---|---|
| Density @ 15° C., kg/m³ | 1006 |
| Kinematic Viscosity @ 50° C., mm²/s | 500 |

The mixed Feedstock (RMK-500) HMFO and Activating Gas was provided to the pilot plant at rates and conditions and the resulting sulfur levels achieved in the table below

TABLE 9

Process Conditions

| Case | HC Feed Rate (ml/h), [LHSV( /h)] | Nm³ H₂/ m³ oil/scf H/bbl oil | Temp (° C. / ° F.) | Pressure (MPa (g)/ psig) | Product (RMK-500) sulfur % wt. |
|---|---|---|---|---|---|
| A | 108.5 [0.25] | 640/3600 | 377/710 | 13.8/2000 | 0.57 |
| B | 95.5 [0.22] | 640/3600 | 390/735 | 13.8/2000 | 0.41 |
| C | 95.5 [0.22] | 640/3600 | 390/735 | 11.7/1700 | 0.44 |
| D | 95.5 [0.22] | 640/3600 | 393/740 | 10.3/1500 | 0.61 |
| E | 95.5 [0.22] | 640/3600 | 393/740 | 17.2/2500 | 0.37 |
| F | 95.5 [0.22] | 640/3600 | 393/740 | 8.3/1200 | 0.70 |
| G | 95.5 [0.22] | 640/3600 | 416/780 | 8.3/1200 | |

The resulting product (RMK-500) HMFO exhibited observed bulk properties consistent with the feedstock (RMK-500) HMFO, except that the sulfur content was significantly reduced as noted in the above table.

One of skill in the art will appreciate that the above product HMFO produced by the inventive process has achieved a LS HMFO (i.e. 0.5% wt. sulfur) product HMFO having bulk characteristics of a ISO 8217 (2017) compliant RMK-500 residual fuel oil. It will also be appreciated that the process can be successfully carried out under non-hydrocracking conditions (i.e. lower temperature and pressure) that substantially reduce the hydrocracking of the feedstock material. It should be noted that when conditions were increased to much higher pressure (Example E) a product with a lower sulfur content was achieved, however it was observed that there was an increase in light hydrocarbons and wild naphtha production.

It will be appreciated by those skilled in the art that changes could be made to the illustrative embodiments described above without departing from the broad inventive concepts thereof. It is understood, therefore, that the inventive concepts disclosed are not limited to the illustrative embodiments or examples disclosed, but it is intended to cover modifications within the scope of the inventive concepts as defined by the claims.

The invention claimed is:

1. A process for treating high sulfur Heavy Marine Fuel Oil for use as feedstock in a subsequent refinery unit, the process comprising: mixing a quantity of Feedstock Heavy Marine Fuel Oil with a quantity of Activating Gas mixture to give a Feedstock Mixture, wherein the Feedstock Heavy Marine Fuel Oil has a maximum kinematic viscosity at 50° C. (ISO 3104) and a density at 15° C. (ISO 3675) resulting in a CCAI is in the range of 780 to 870; a flash point (ISO 2719) no lower than 60.0° C.; a total sediment-aged (ISO 10307-2) of less than 0.10% wt.; a carbon residue-micro method (ISO 10370) less than 20.00% wt., and a maximum aluminum plus silicon (ISO 10478) content of 60 mg/kg: contacting the Feedstock Mixture with one or more catalysts under reactive conditions to form a Process Mixture from said Feedstock Mixture; receiving said Process Mixture and separating the Product Heavy Marine Fuel Oil from the Process Mixture to form a Product Heavy Marine Fuel Oil; and, discharging the Product Heavy Marine Fuel Oil to a subsequent refinery unit.

2. The process of claim 1 wherein the Feedstock Heavy Marine Fuel Oil complies with ISO 8217 (2017) Table 2 as a residual marine fuel except that it has a sulfur content (ISO 14596 or ISO 8754) greater than 0.5% wt and wherein the Product Heavy Marine Fuel Oil complies with ISO 8217 (2017) Table 2 as a residual marine fuel and has a sulfur content (ISO 14596 or ISO 8754) between the range of 0.50 mass % to 0.05 mass %.

3. The process of claim 2, further comprising fractionating the Product Heavy Marine Fuel Oil to remove a light to middle distillate fraction, said light to middle distillate fraction have a maximum boiling point less than 650° F.

4. The process of claim 2 wherein the one or more catalysts comprises: a porous inorganic oxide catalyst carrier and a transition metal catalyst, wherein the porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6, 8, 9 and 10 of the Periodic Table; and wherein the Activating Gas is selected from mixtures of nitrogen, hydrogen, carbon dioxide, gaseous water, and methane, such that Activating Gas has an ideal gas partial pressure of hydrogen (PH2) greater than 80% of the total pressure of the Activating Gas mixture (P).

5. The process of claim 4 wherein the reactive conditions comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig; and, the indicated temperature is between of 500° F. to 900° F., and, wherein the liquid hourly space velocity is between 0.05 oil/hour/m3 catalyst and 1.0 oil/hour/m3 catalyst.

6. The process of claim 1 wherein said Product Heavy Marine Fuel Oil has a maximum sulfur content (ISO 14596 or ISO 8754) between the range of 0.01 mass % to 0.5 mass % and the subsequent refinery process is selected from the group consisting of: anode grade coking process unit; needle grade coking process unit; and fluid catalytic cracking process unit.

7. A process for treating high sulfur Heavy Marine Fuel Oil for use as feedstock in a subsequent refinery unit, the process comprising: mixing a quantity of Feedstock Heavy Marine Fuel Oil with a quantity of Activating Gas mixture to give a Feedstock Mixture; contacting the Feedstock Mixture with one or more catalysts under reactive conditions to form a Process Mixture from said Feedstock Mixture; receiving said Process Mixture and separating the Product Heavy Marine Fuel Oil from the Process Mixture to form a Product Heavy Marine Fuel Oil; and, discharging the Product Heavy Marine Fuel Oil to a subsequent refinery unit, wherein the Product Heavy Marine Fuel Oil has a maximum kinematic viscosity at 50° C. (ISO 3104) and a density at 15° C. (ISO 3675) resulting in a CCAI is in the range of 780 to 870; a flash point (ISO 2719) no lower than 60.0° C.; a total sediment-aged (ISO 10307-2) of less than 0.10% wt.; a carbon residue-micro method (ISO 10370) less than 20.00% wt., and a maximum aluminum plus silicon (ISO 10478) content of 60 mg/kg.

8. The process of claim 7 wherein the Feedstock Heavy Marine Fuel Oil complies with ISO 8217 (2017) Table 2 as a residual marine fuel except that it has a sulfur content (ISO 14596 or ISO 8754) greater than 0.5% wt and wherein the Product Heavy Marine Fuel Oil complies with ISO 8217

(2017) Table 2 as a residual marine fuel and has a sulfur content (ISO 14596 or ISO 8754) between the range of 0.50 mass % to 0.05 mass %.

9. The process of claim 8, further comprising fractionating the Product Heavy Marine Fuel Oil to remove a light to middle distillate fraction, said light to middle distillate fraction have a maximum boiling point less than 650° F.

10. The process of claim 7 wherein the one or more catalysts comprises: a porous inorganic oxide catalyst carrier and a transition metal catalyst, wherein the porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier, and wherein the transition metal catalyst is one or more metals selected from the group consisting of group 6, 8, 9 and 10 of the Periodic Table; and wherein the Activating Gas is selected from mixtures of nitrogen, hydrogen, carbon dioxide, gaseous water, and methane, such that Activating Gas has an ideal gas partial pressure of hydrogen (pH2) greater than 80% of the total pressure of the Activating Gas mixture (P).

11. The process of claim 10 wherein the reactive conditions comprise: the ratio of the quantity of the Activating Gas to the quantity of Feedstock Heavy Marine Fuel Oil is in the range of 250 scf gas/bbl of Feedstock Heavy Marine Fuel Oil to 10,000 scf gas/bbl of Feedstock Heavy Marine Fuel Oil; a the total pressure is between of 250 psig and 3000 psig;

and, the indicated temperature is between of 500° F. to 900° F., and, wherein the liquid hourly space velocity is between 0.05 oil/hour/m$^3$ catalyst and 1.0 oil/hour/m$^3$ catalyst.

12. The process of claim 7 wherein said Product Heavy Marine Fuel Oil has a maximum sulfur content (ISO 14596 or ISO 8754) between the range of 0.01 mass % to 0.5 mass % and the subsequent refinery process is selected from the group consisting of: anode grade coking process unit; needle grade coking process unit; and fluid catalytic cracking process unit.

* * * * *